US012743004B2

(12) United States Patent
Moon et al.

(10) Patent No.: US 12,743,004 B2
(45) Date of Patent: Sep. 22, 2026

(54) CAMERA ACTUATOR

(71) Applicant: LG INNOTEK CO., LTD., Seoul (KR)

(72) Inventors: Young Seop Moon, Seoul (KR); Jun Seok Oh, Seoul (KR); Young Bae Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 479 days.

(21) Appl. No.: 18/037,493

(22) PCT Filed: Nov. 18, 2021

(86) PCT No.: PCT/KR2021/017017
§ 371 (c)(1),
(2) Date: May 17, 2023

(87) PCT Pub. No.: WO2022/108369
PCT Pub. Date: May 27, 2022

(65) Prior Publication Data

US 2024/0012313 A1 Jan. 11, 2024

(30) Foreign Application Priority Data

Nov. 18, 2020 (KR) ........................ 10-2020-0154337

(51) Int. Cl.
*G03B 13/36* (2021.01)
*G03B 5/00* (2021.01)
(Continued)

(52) U.S. Cl.
CPC ............... *G03B 13/36* (2013.01); *G03B 5/00* (2013.01); *H04N 23/51* (2023.01); *G03B 2205/0046* (2013.01); *H04N 23/687* (2023.01)

(58) Field of Classification Search
CPC .. G03B 13/36; G03B 5/00; G03B 2205/0046; G03B 17/17; G03B 2205/0069;
(Continued)

(56) References Cited

U.S. PATENT DOCUMENTS

| | | | |
|---|---|---|---|
| 6,292,308 | B1 | 9/2001 | Tsuzuki et al. |
| 2003/0227560 | A1 | 12/2003 | Mattsson et al. |

(Continued)

FOREIGN PATENT DOCUMENTS

| | | | |
|---|---|---|---|
| CN | 110531480 | A | 12/2019 |
| KR | 10-2018-0098463 | A | 9/2018 |

(Continued)

*Primary Examiner* — Thomas K Pham
*Assistant Examiner* — Ruby L Kauffman
(74) *Attorney, Agent, or Firm* — Birch, Stewart, Kolasch & Birch, LLP

(57) ABSTRACT

A camera actuator according to an embodiment includes a moving part including a lens; and a driving part for moving the moving part in the optical axis direction; wherein the driving part includes: a circuit board; a sensing part disposed on the circuit board and sensing a position of the moving part; and a driver IC disposed on the circuit board and connected to the sensing part; wherein the sensing part includes first and second sensing parts, and wherein a distance between the first sensing part and the driver IC corresponds to a distance between the second sensing part and the driver IC.

16 Claims, 27 Drawing Sheets

(51) Int. Cl.
*H04N 23/51* (2023.01)
*H04N 23/68* (2023.01)

(58) Field of Classification Search
CPC .. G03B 3/10; G03B 30/00; G03B 2205/0007; H04N 23/51; H04N 23/687; H04N 23/55; H04N 23/54; H04N 23/57; G02B 7/02; G02B 7/021; G02B 7/023; G02B 7/08; G02B 7/09; G02B 7/102
See application file for complete search history.

(56) References Cited

U.S. PATENT DOCUMENTS

| | | | | |
|---|---|---|---|---|
| 2015/0110482 | A1 | 4/2015 | Suzuka | |
| 2016/0219222 | A1 | 7/2016 | Heo et al. | |
| 2017/0017056 | A1 | 1/2017 | Park et al. | |
| 2018/0210163 | A1* | 7/2018 | Jung | G03B 5/00 |
| 2018/0321460 | A1* | 11/2018 | Lee | H04N 23/54 |
| 2020/0225442 | A1* | 7/2020 | Weng | H04N 23/54 |
| 2020/0348479 | A1* | 11/2020 | Kwon | G03B 17/12 |
| 2021/0389551 | A1 | 12/2021 | Jang | |
| 2022/0210296 | A1 | 6/2022 | Bang et al. | |
| 2022/0229347 | A1 | 7/2022 | Kim et al. | |
| 2022/0239808 | A1* | 7/2022 | Jang | G03B 30/00 |
| 2023/0213837 | A1* | 7/2023 | Lee | G03B 5/00<br>359/824 |

FOREIGN PATENT DOCUMENTS

| | | | | |
|---|---|---|---|---|
| KR | 10-2020-0006607 | A | 1/2020 | |
| KR | 10-2020-0041062 | A | 4/2020 | |
| KR | 10-2020-0085208 | A | 7/2020 | |
| KR | 10-2020-0122166 | A | 10/2020 | |
| KR | 10-2020-0125221 | A | 11/2020 | |
| KR | 20200139581 | A * | 12/2020 | G03B 19/07 |

* cited by examiner

【FIG. 1】
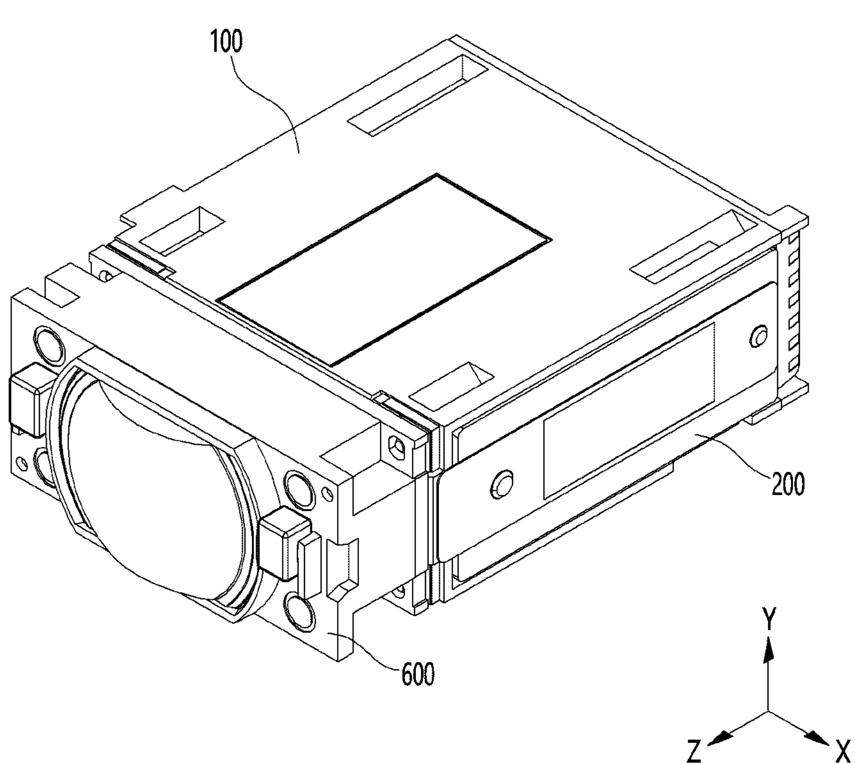

【FIG. 2】
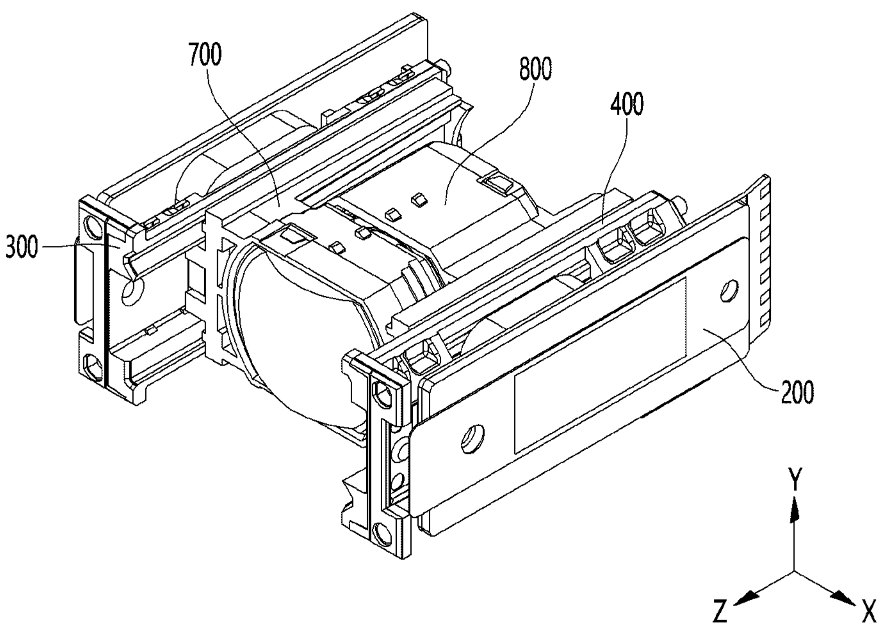
【FIG. 3】
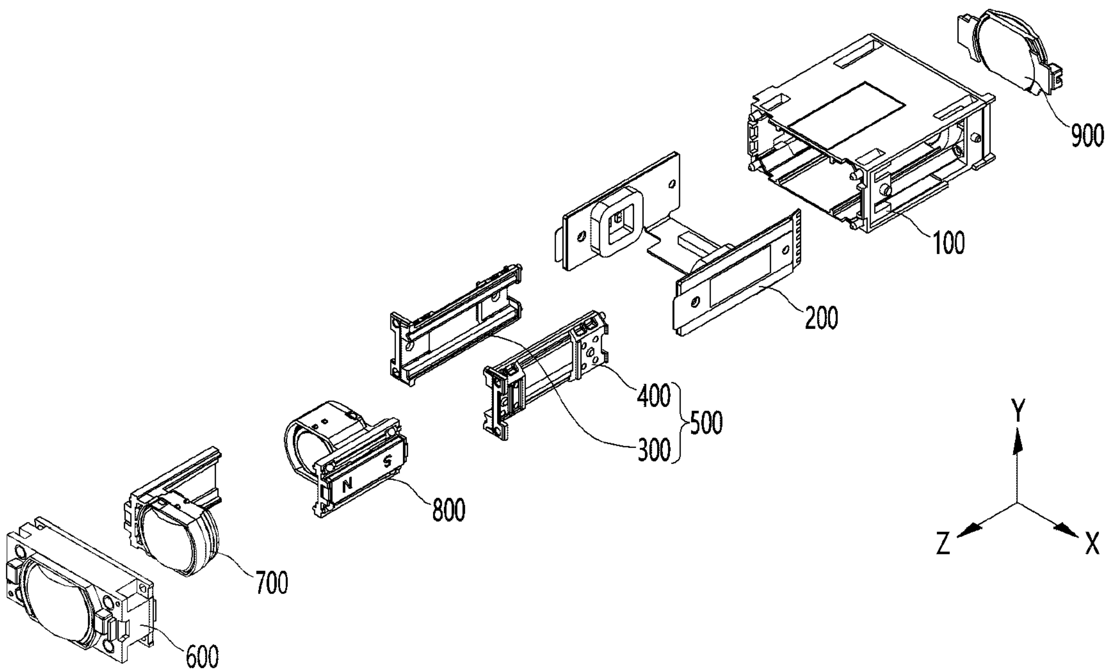

【FIG. 4】
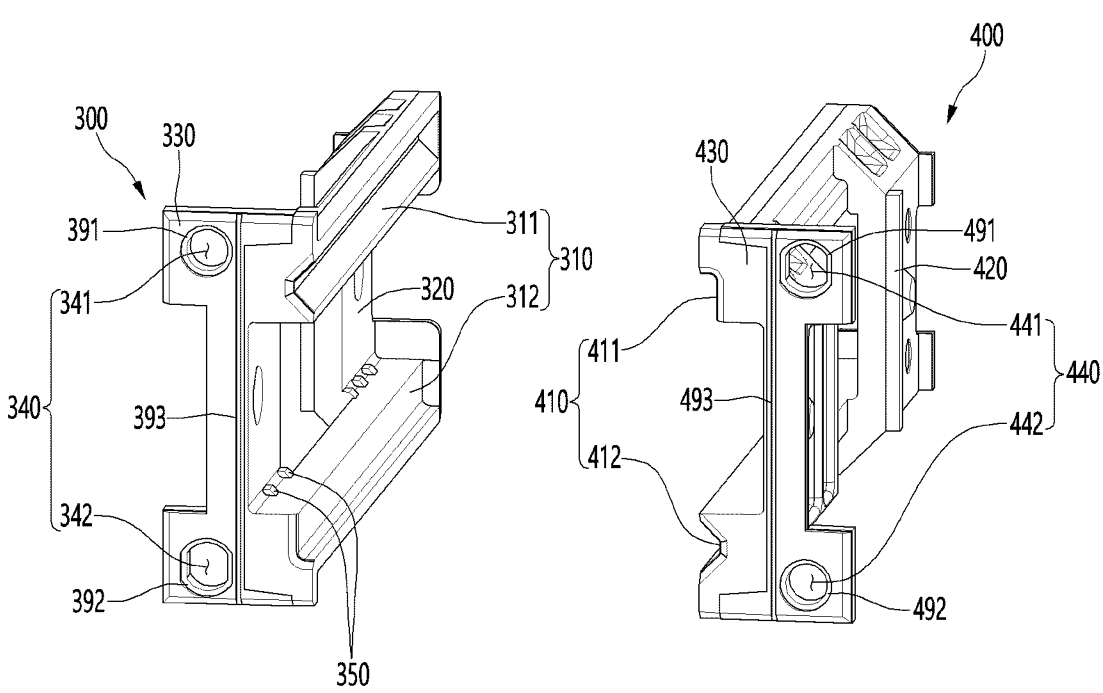

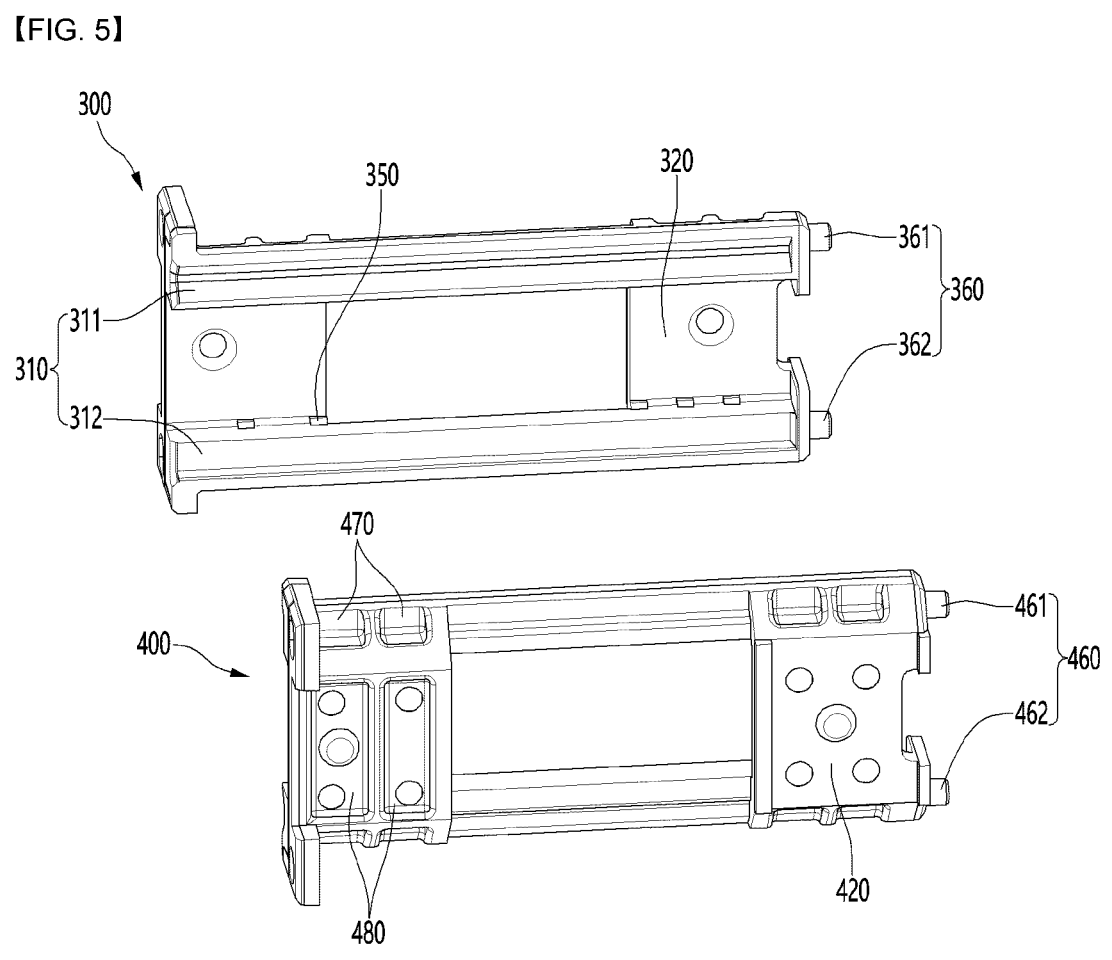

【FIG. 6】
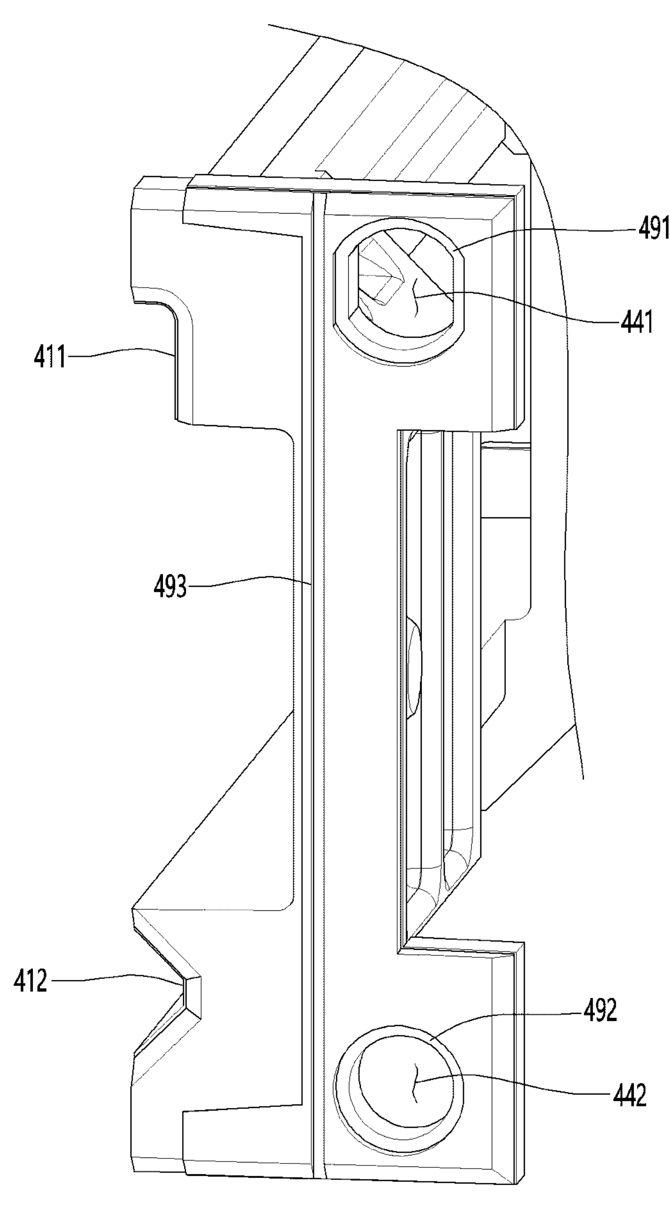

【FIG. 7】
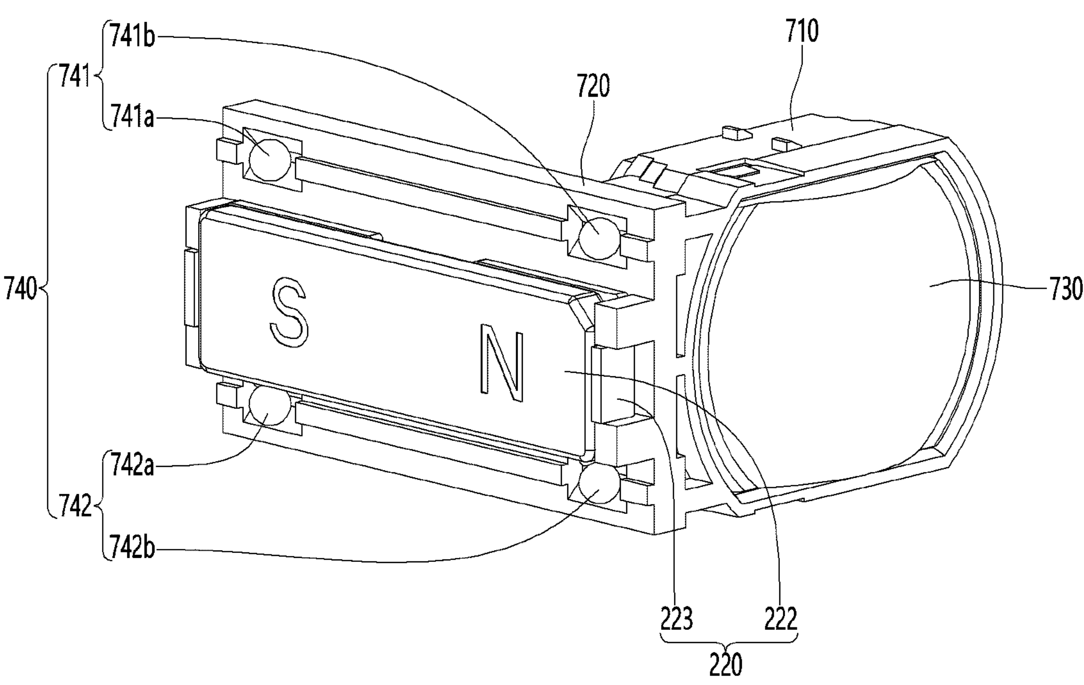
【FIG. 8】
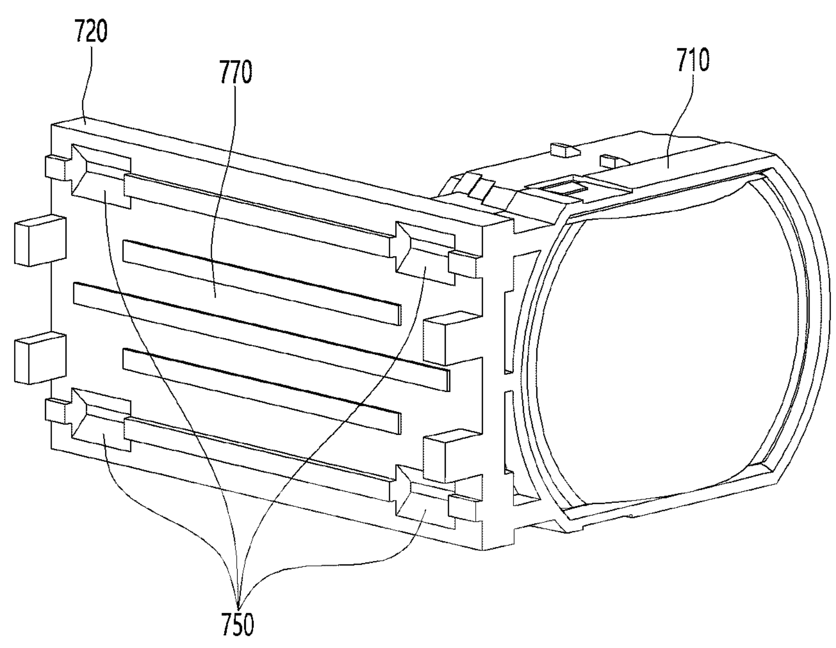

【FIG. 9】
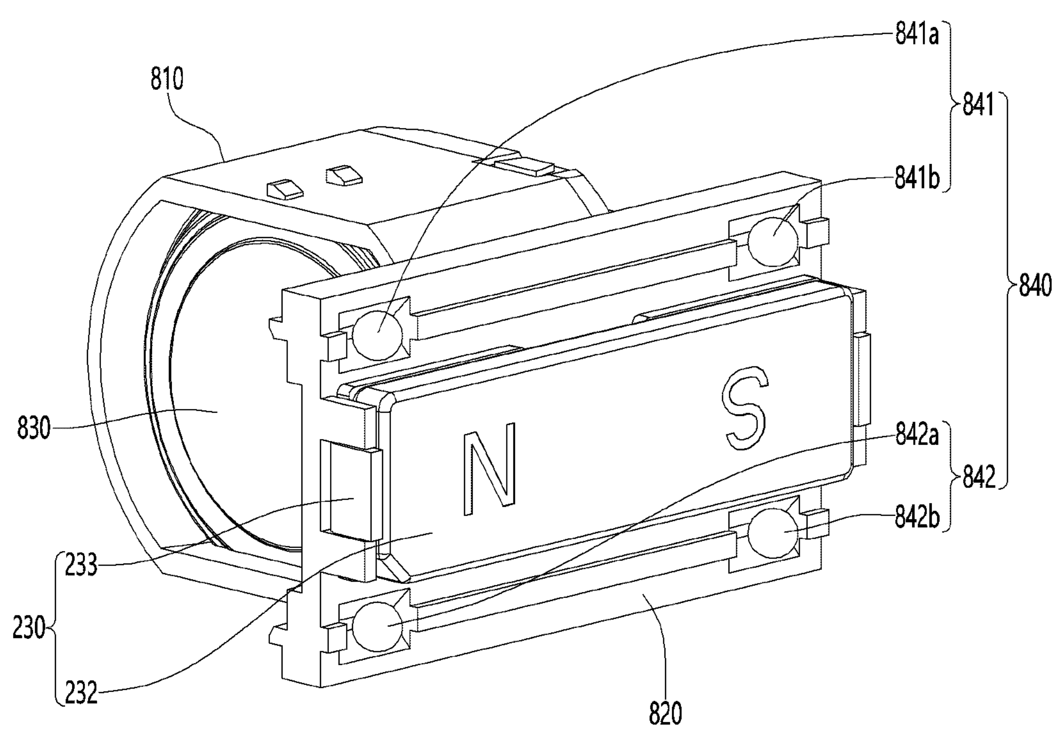

【FIG. 10】
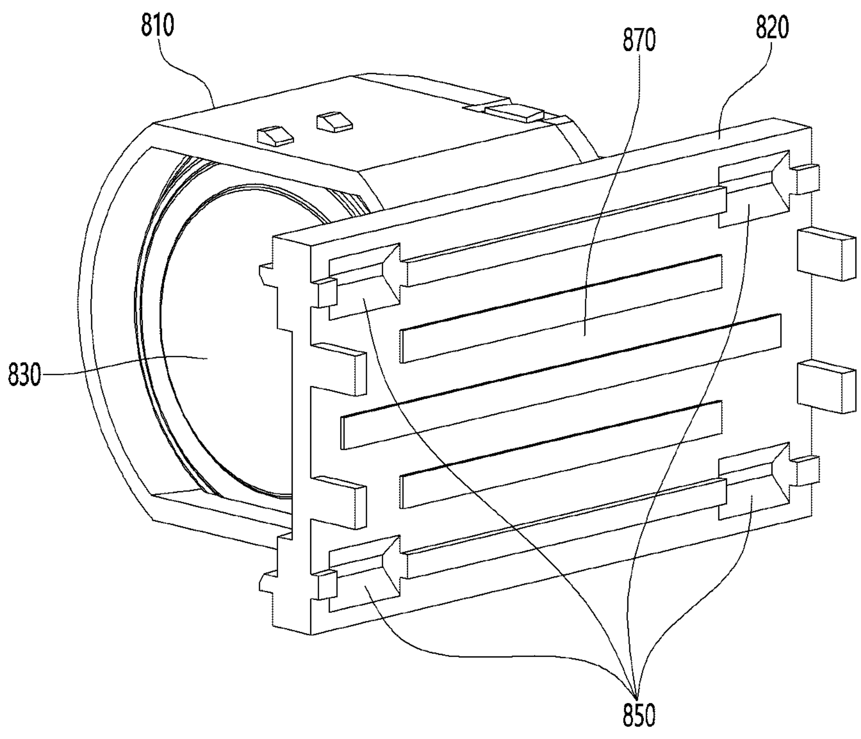
【FIG. 11】
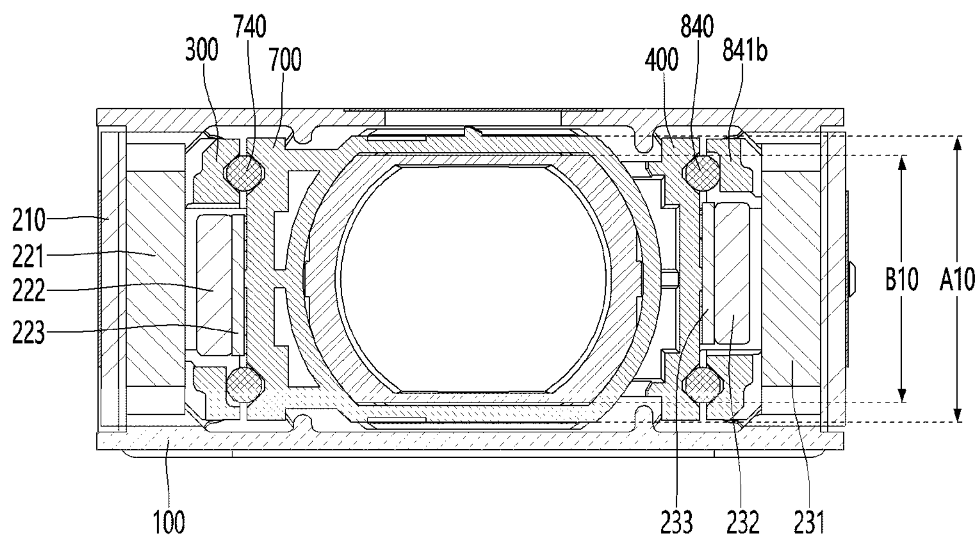

【FIG. 12】
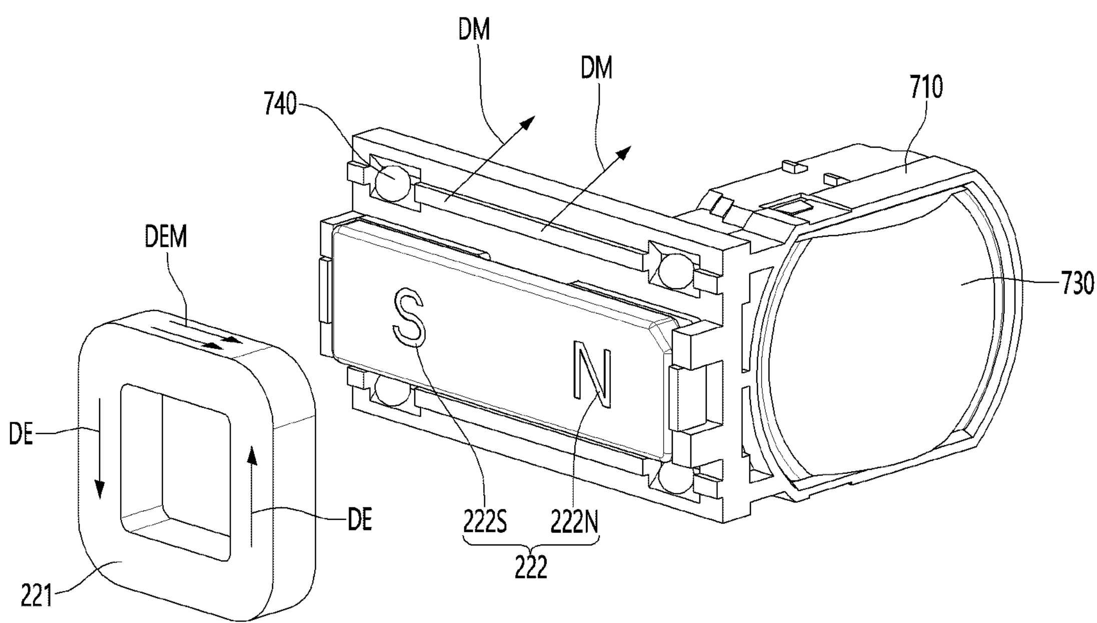
【FIG. 13】
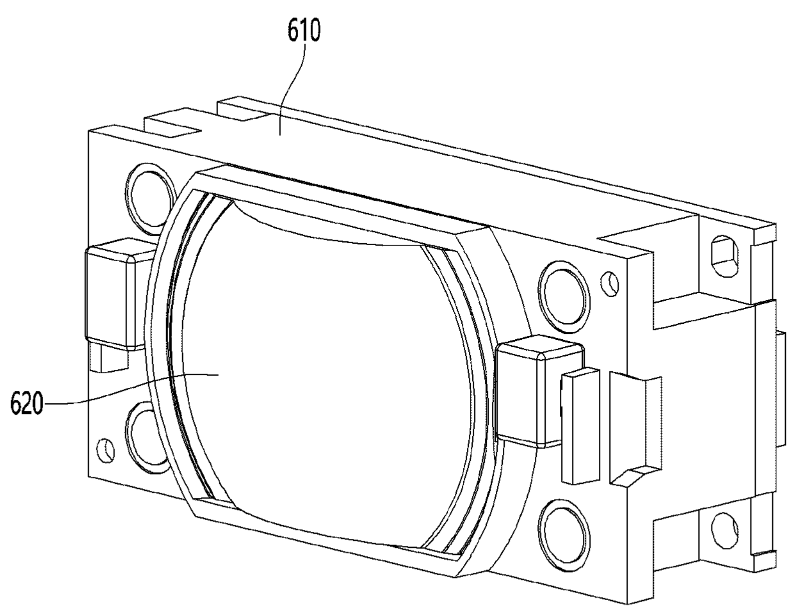

【FIG. 14】
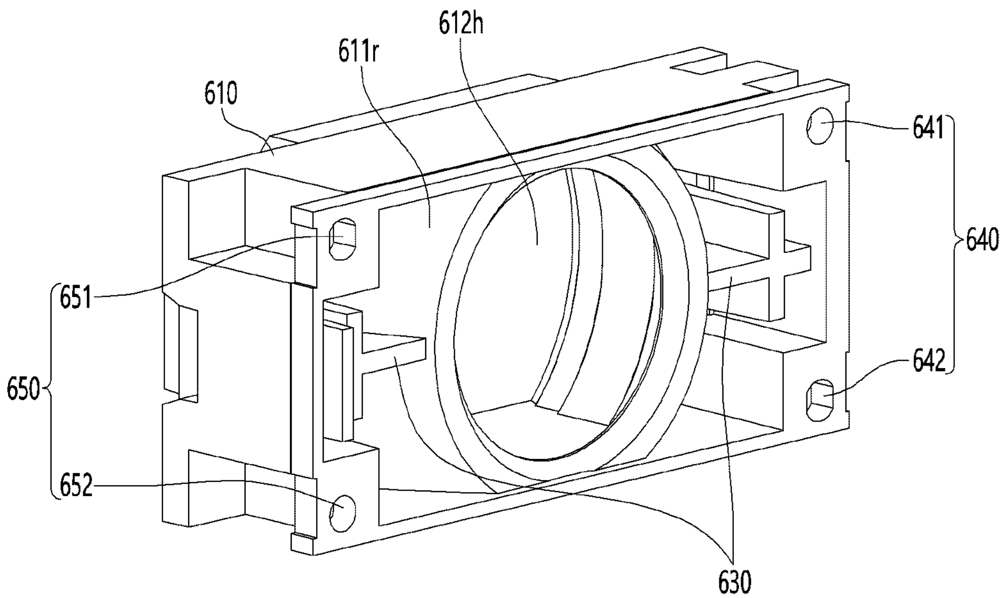
【FIG. 15】
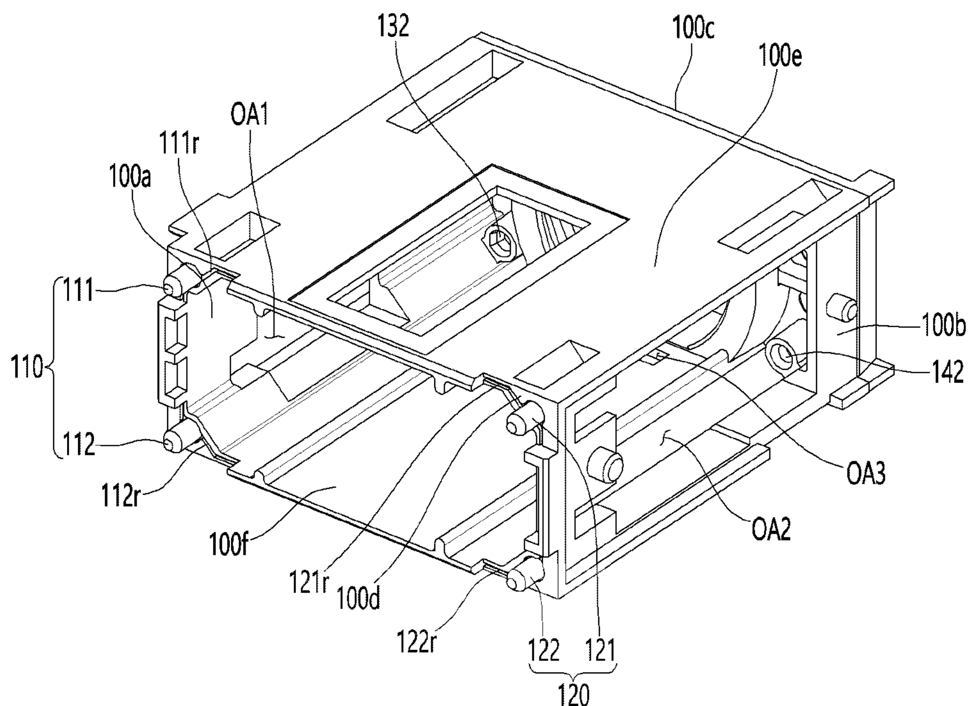

【FIG. 16】
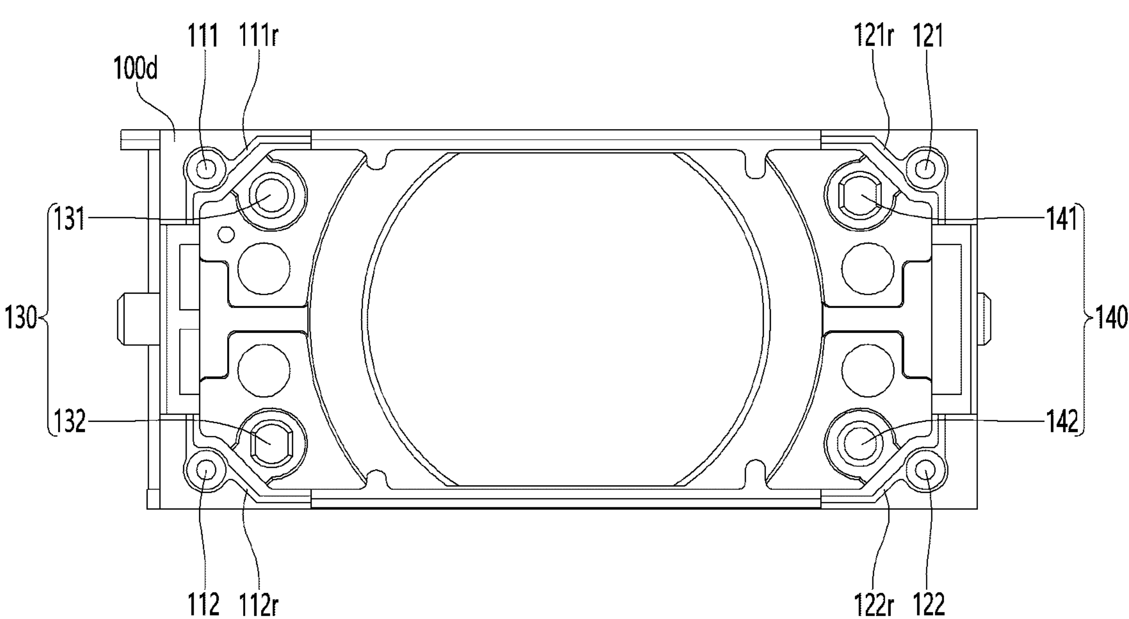

【FIG. 17】
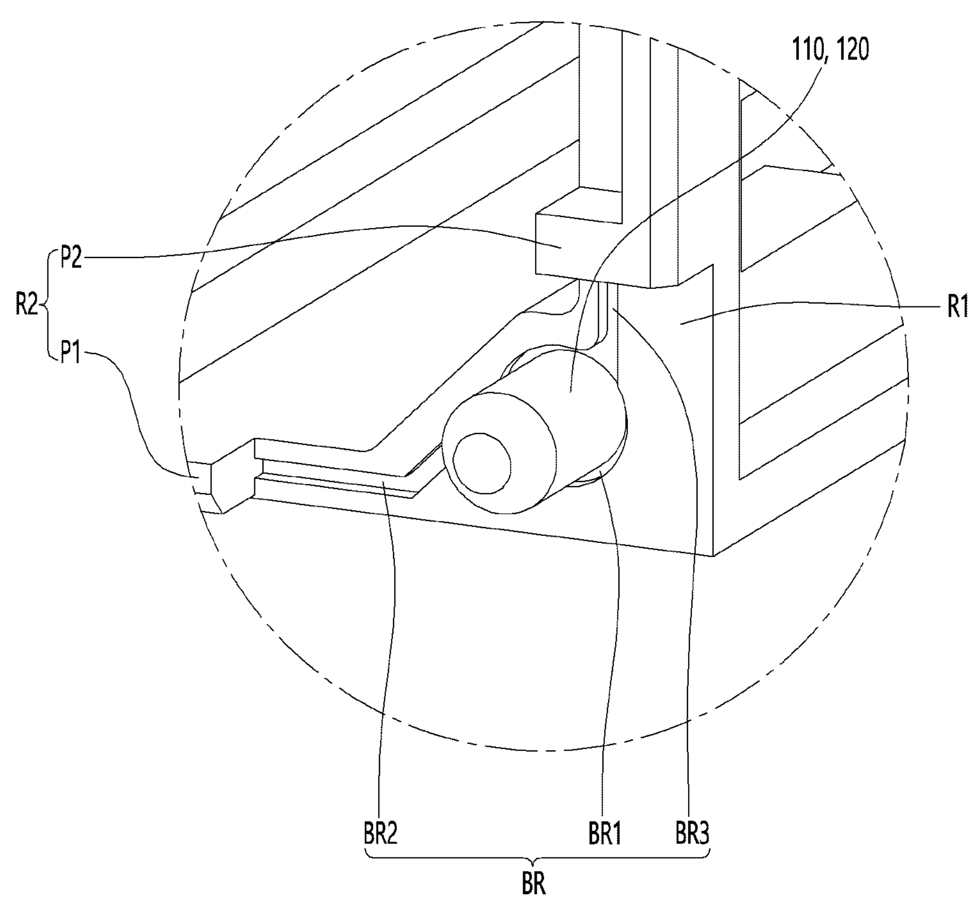

【FIG. 18】
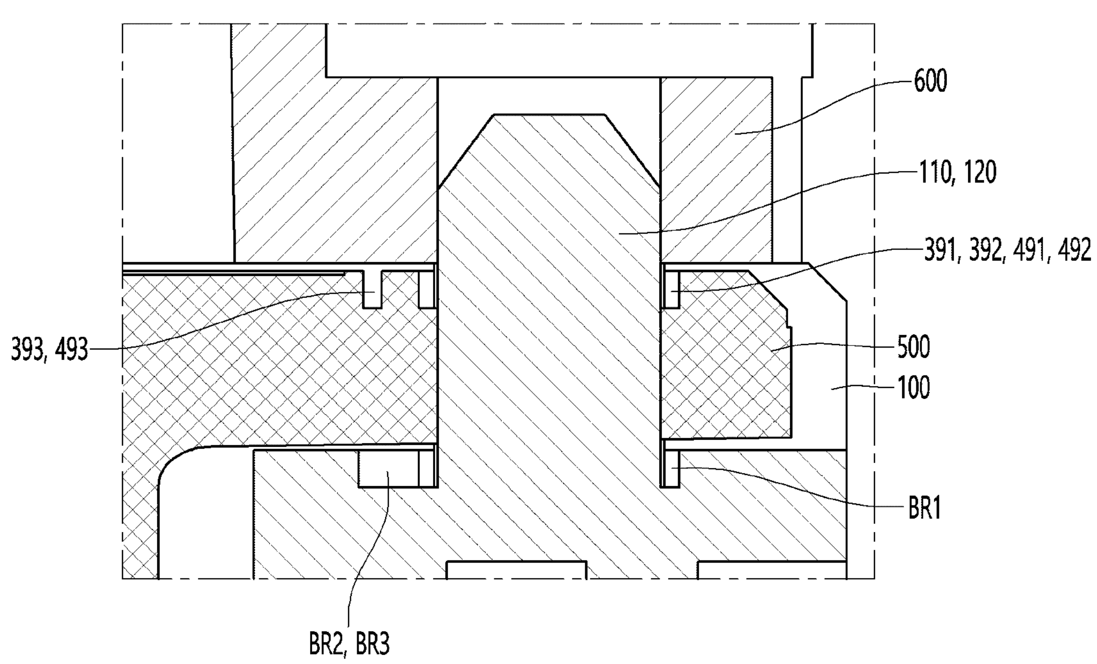

【FIG. 19a】
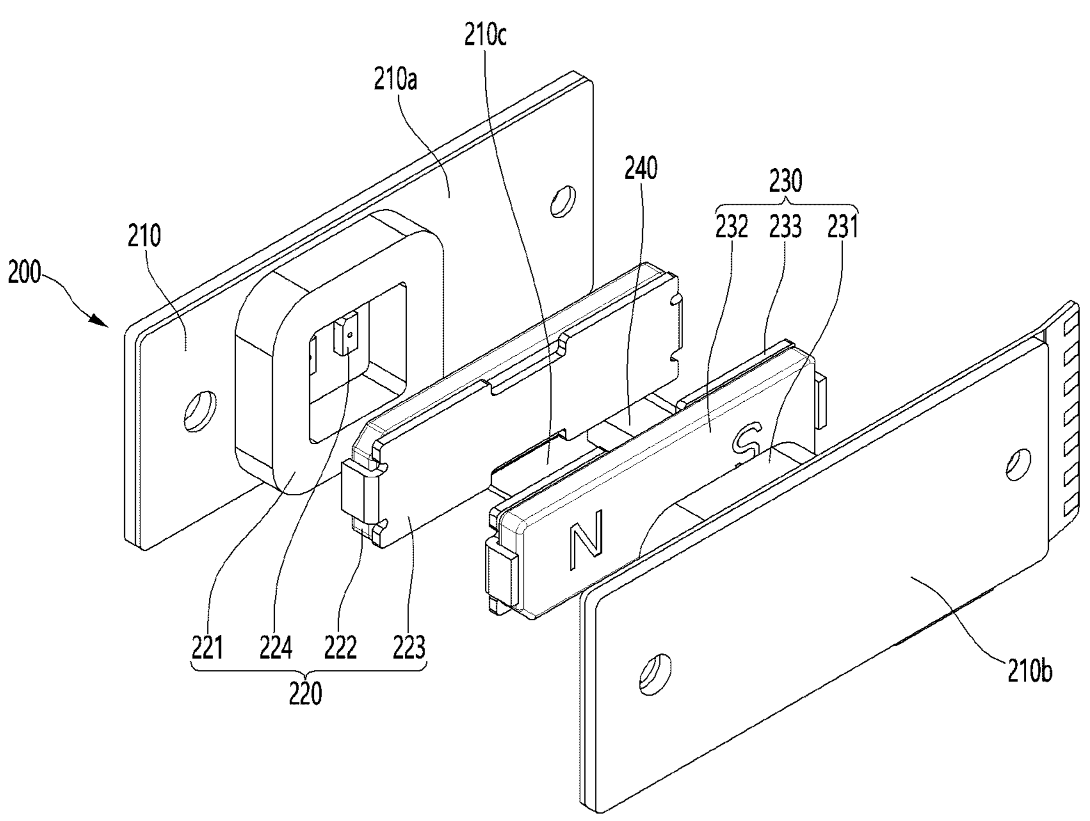

【FIG. 19b】
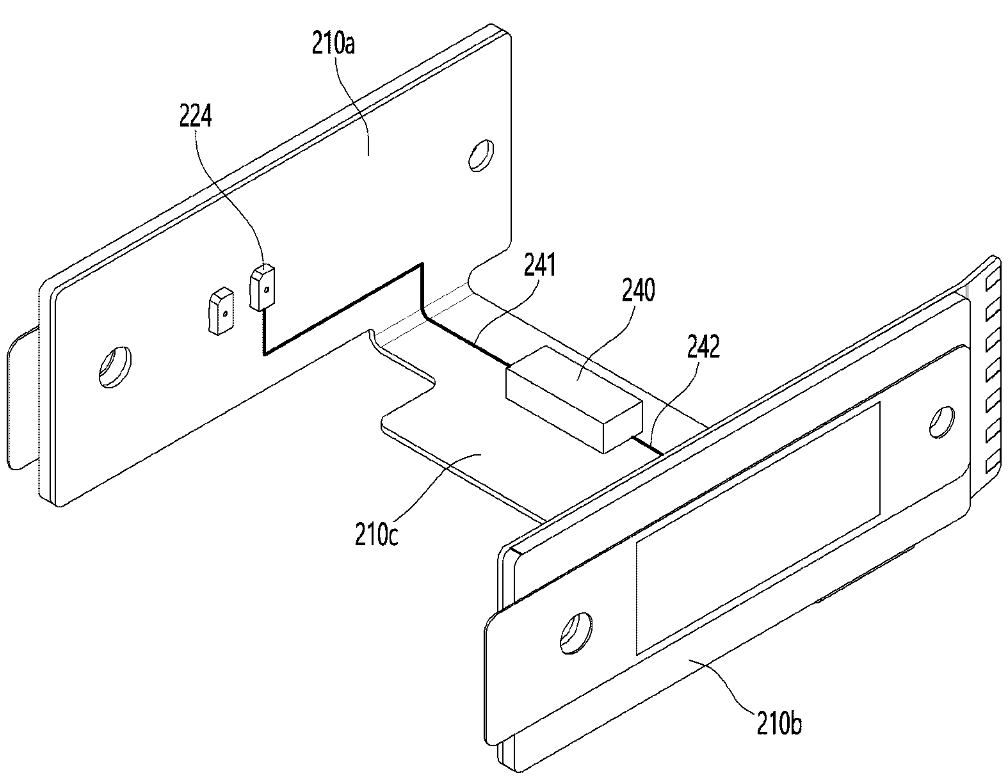

【FIG. 20a】
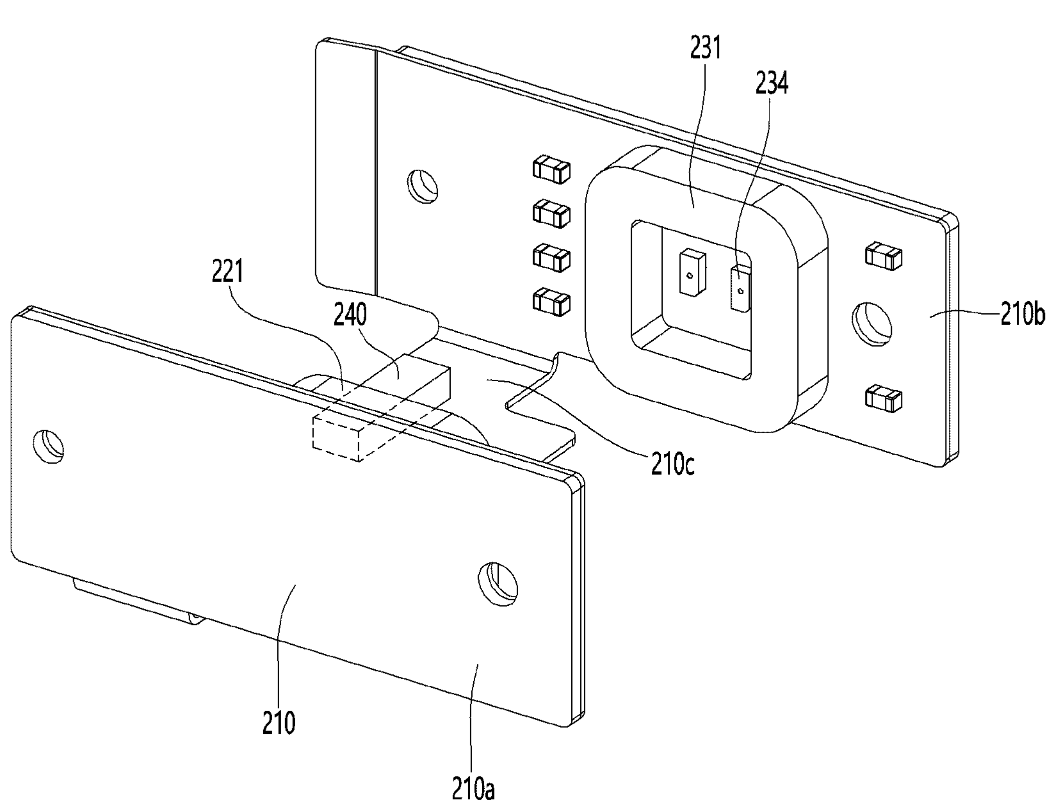

【FIG. 20b】
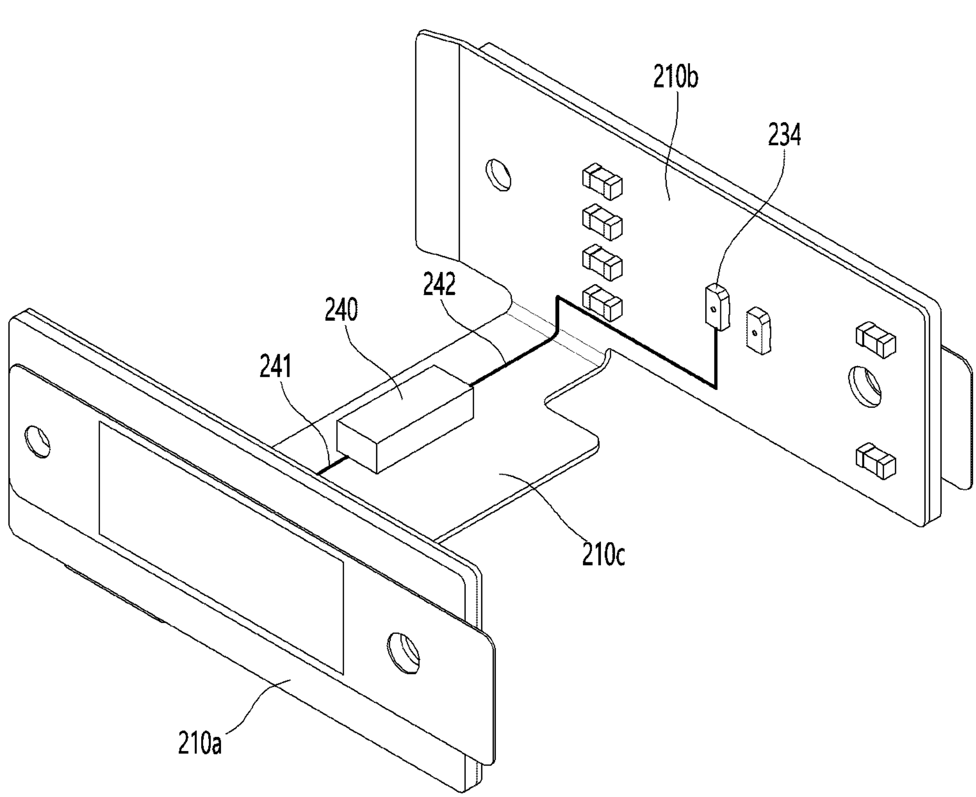

【FIG. 21a】
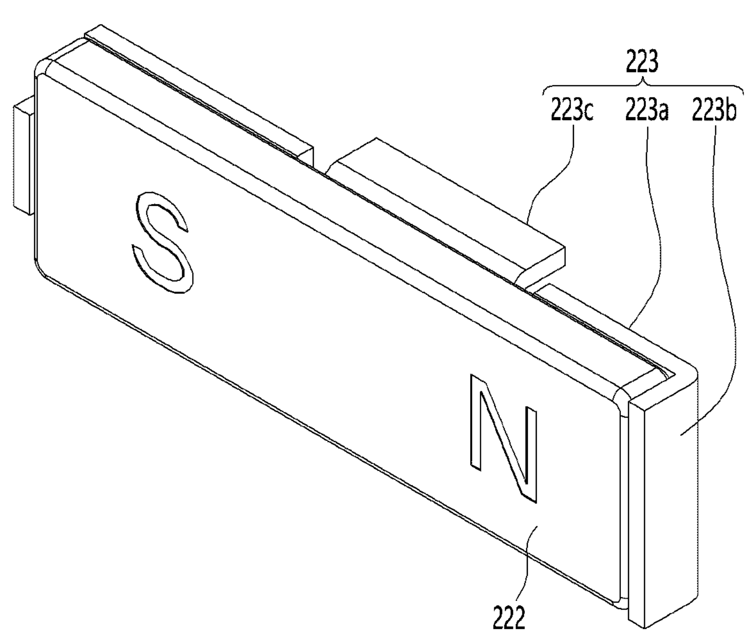
【FIG. 21b】
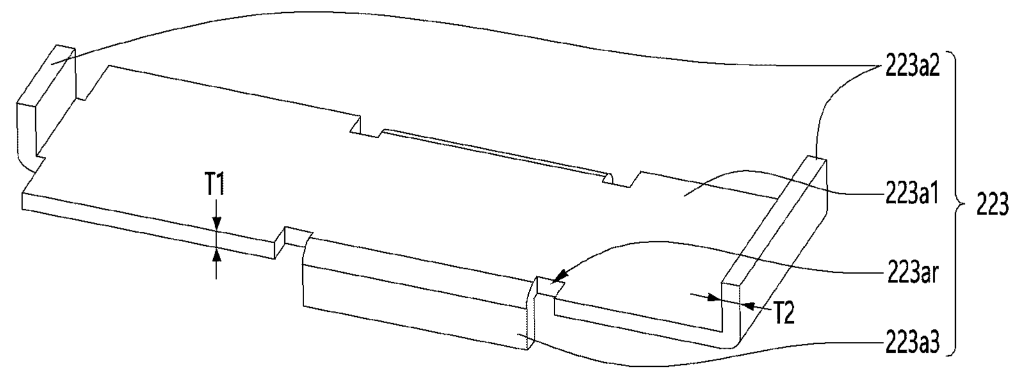

【FIG. 21c】
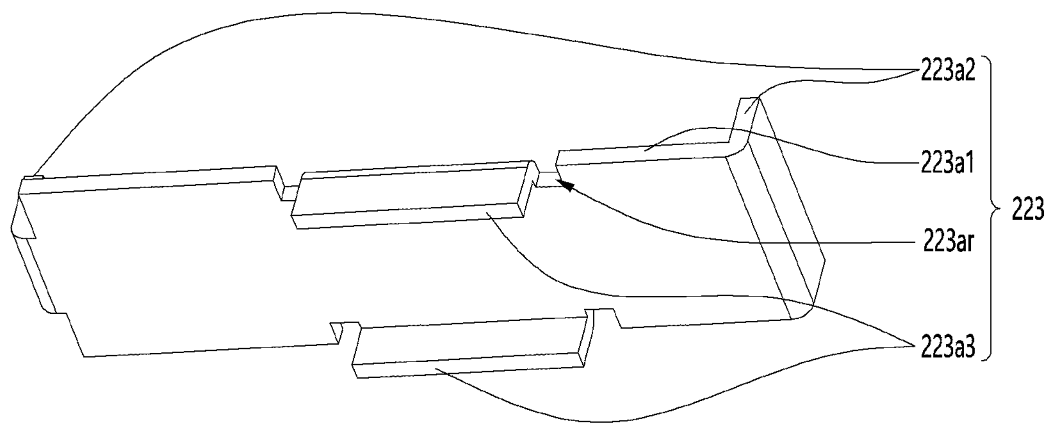
【FIG. 21d】
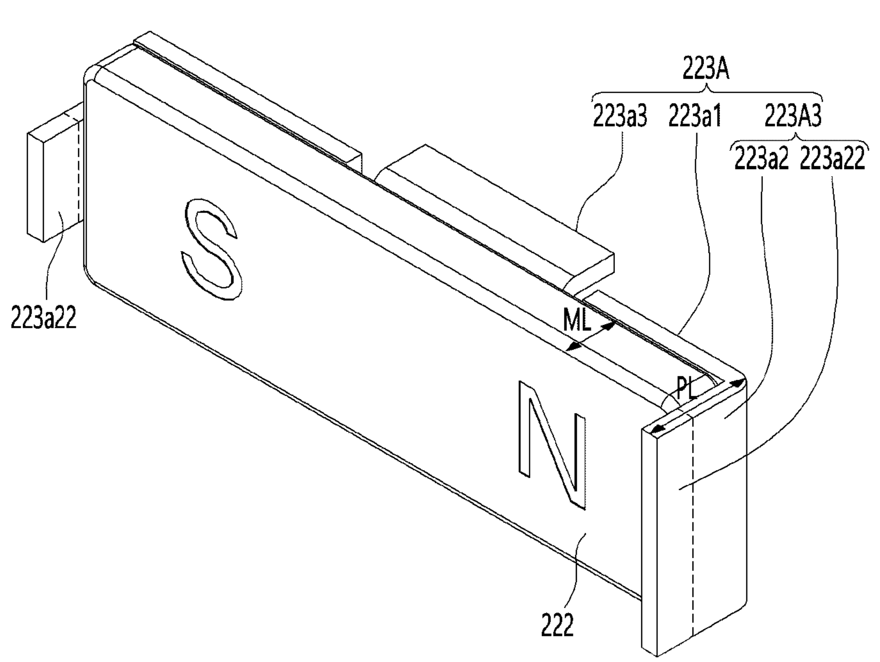

【FIG. 21e】
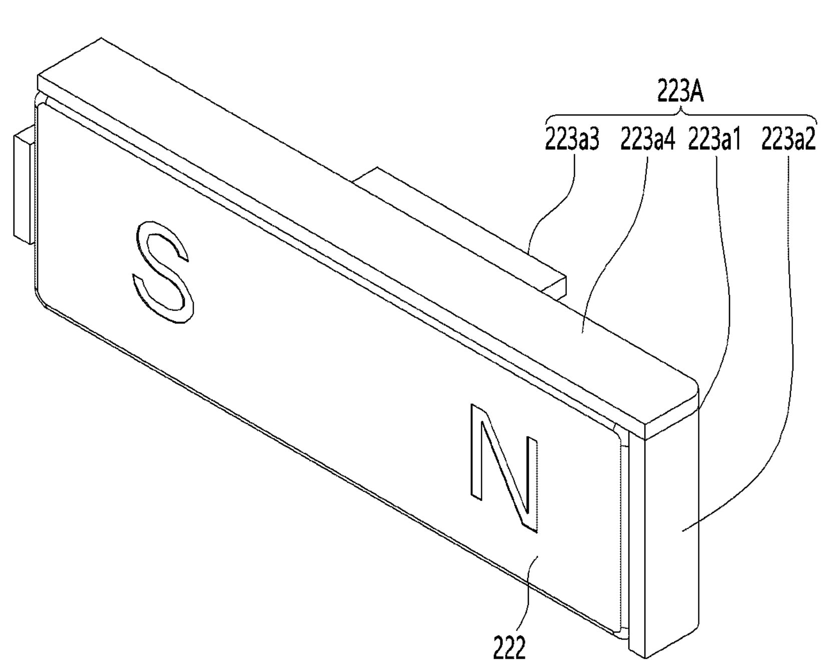

【FIG. 22】
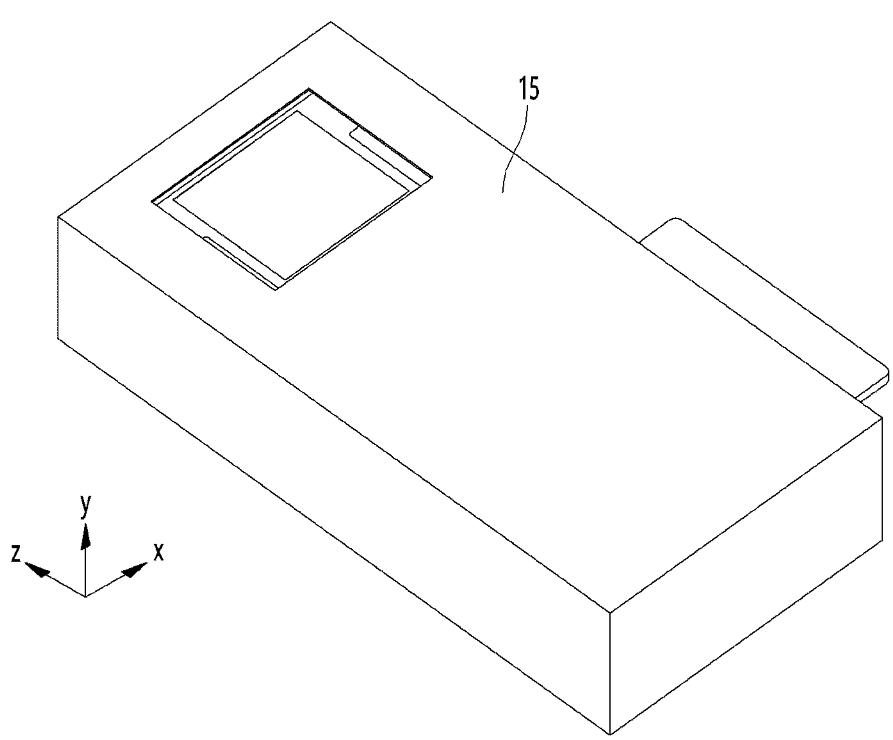

【FIG. 23】
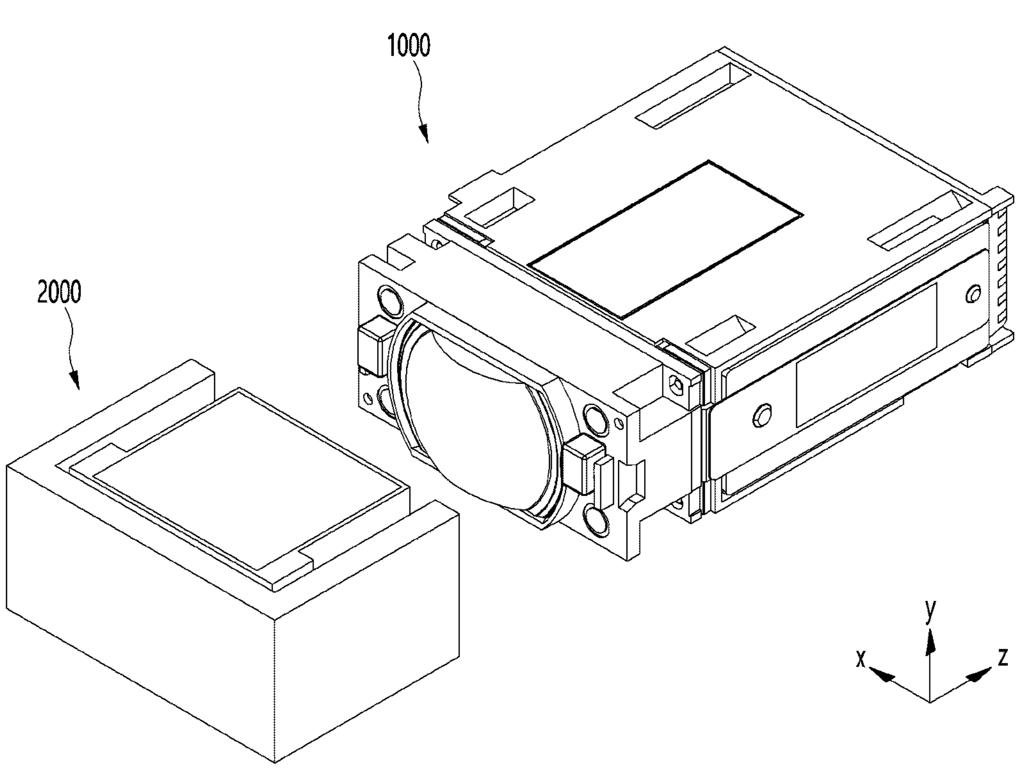

【FIG. 24】
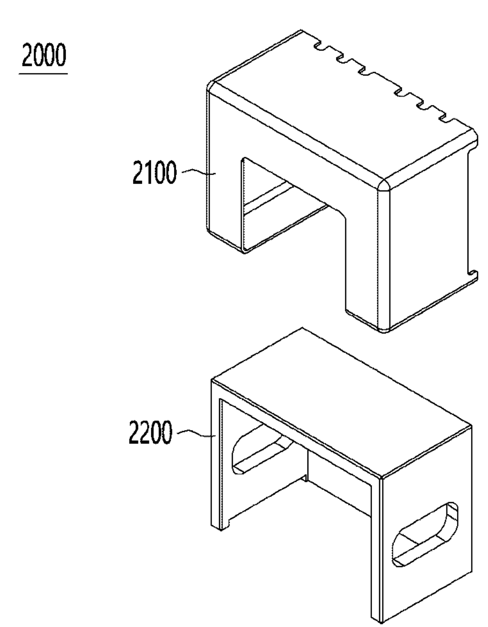
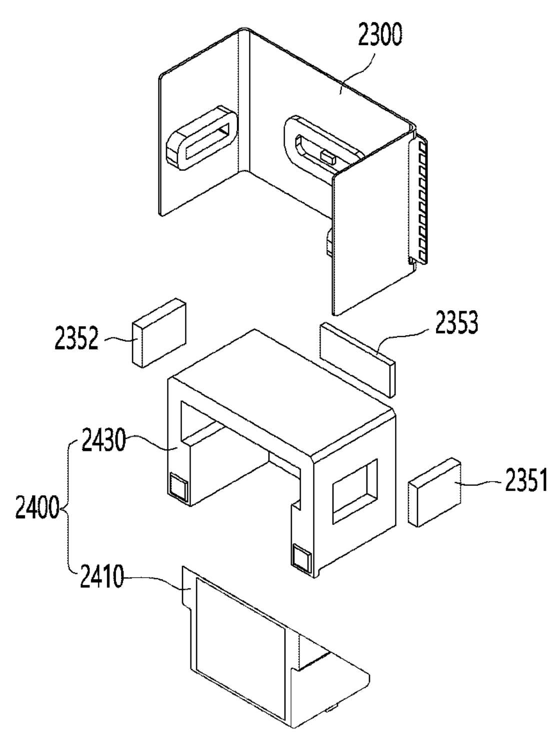

【FIG. 25】
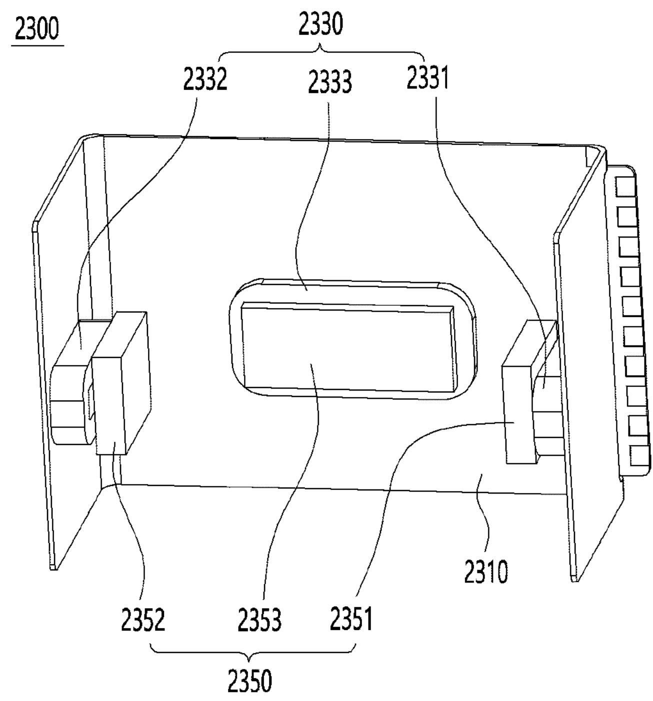

【FIG. 26】
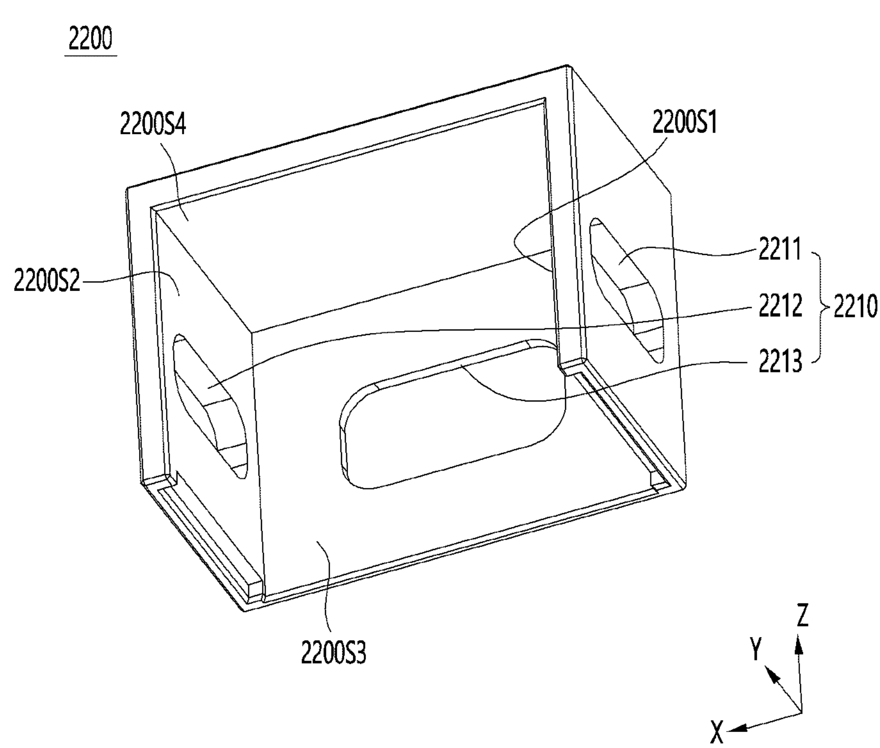

【FIG. 27】
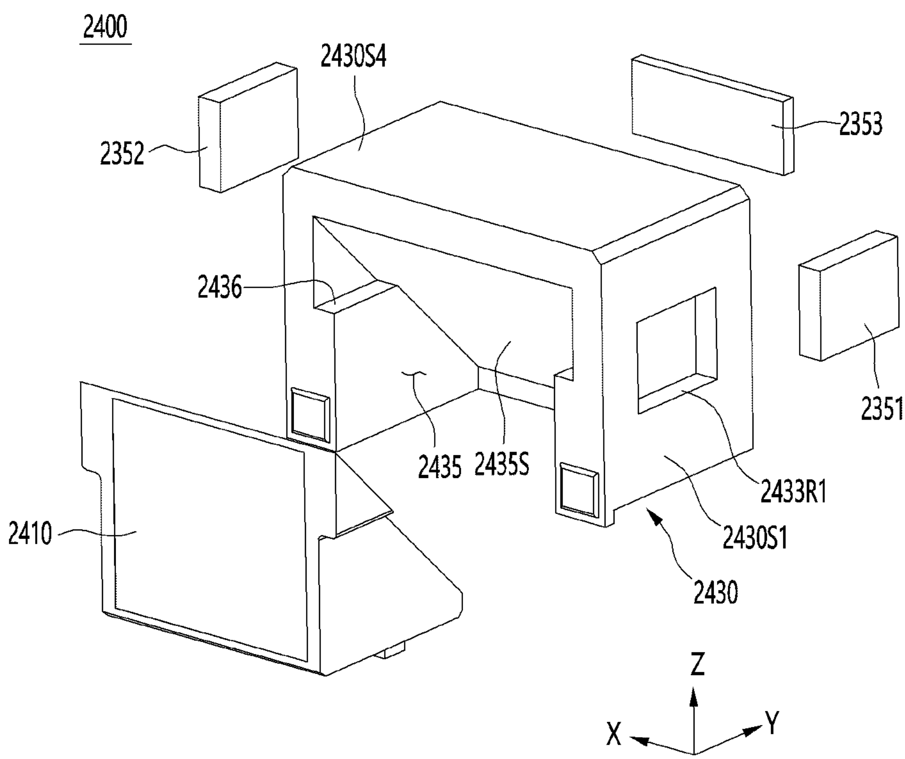
【FIG. 28】
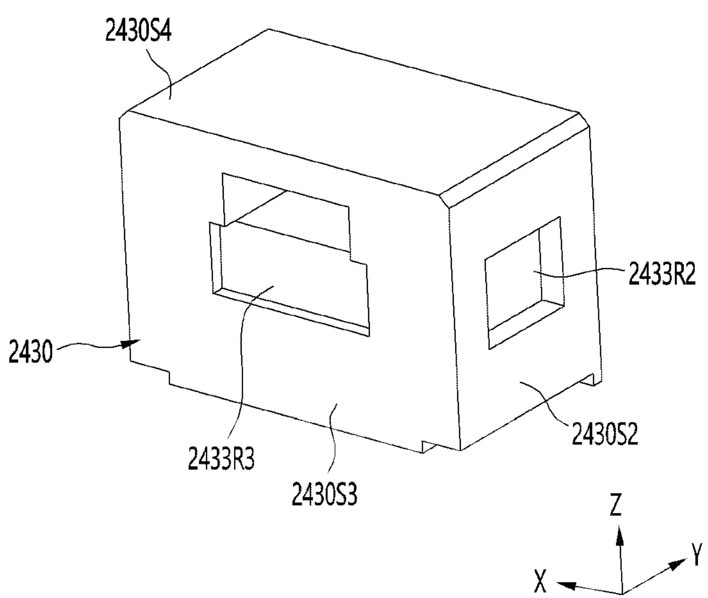

【FIG. 29】
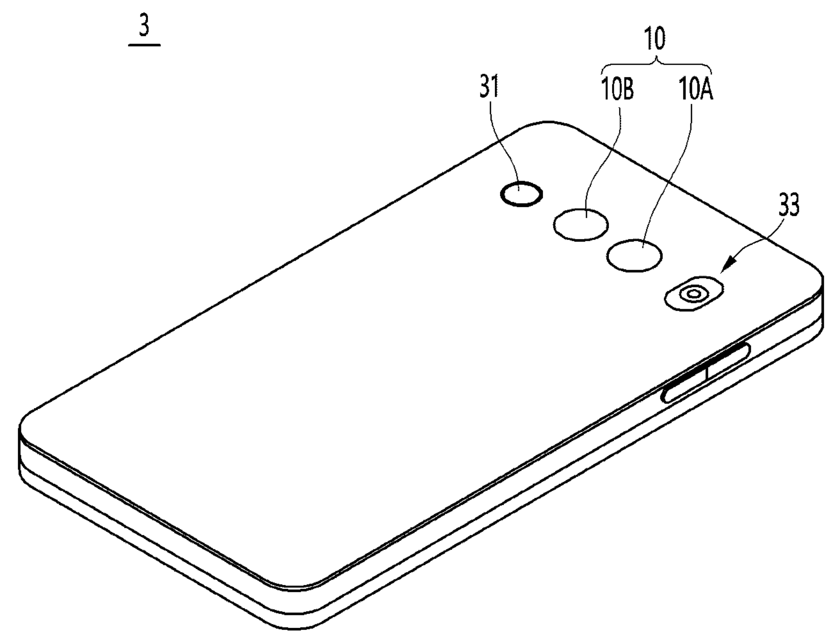
【FIG. 30】
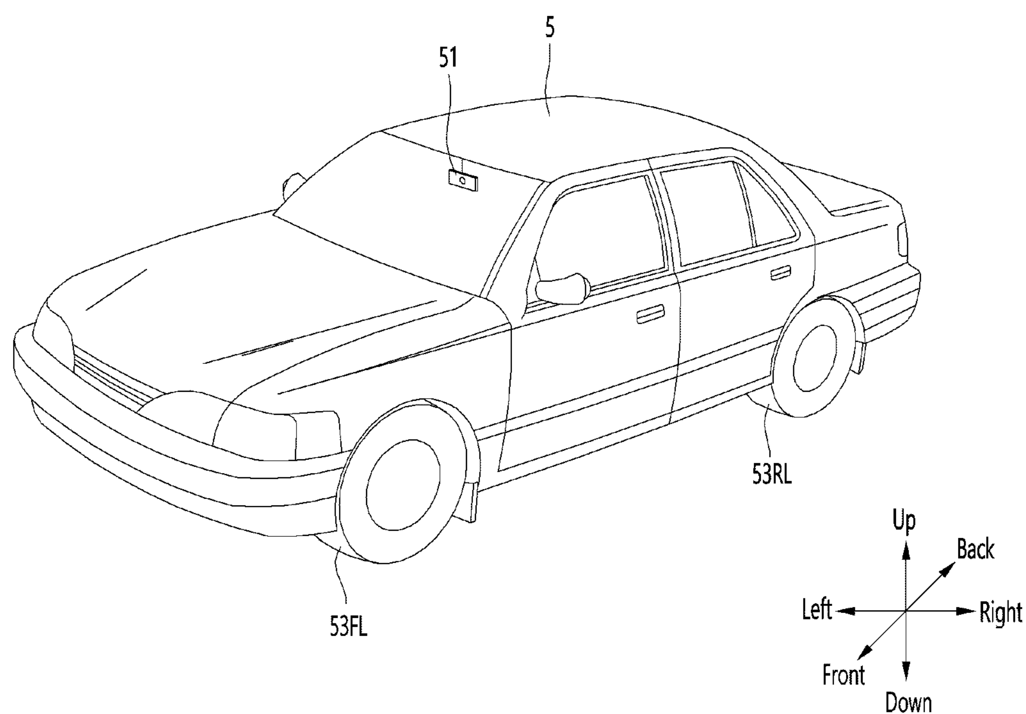

CAMERA ACTUATOR

CROSS REFERENCE TO RELATED APPLICATIONS

This application is the National Phase of PCT International Application No. PCT/KR2021/017017, filed on Nov. 18, 2021, which claims priority under 35 U.S.C. 119(a) to Patent Application No. 10-2020-0154337, filed in the Republic of Korea on Nov. 18, 2020, all of which are hereby expressly incorporated by reference into the present application.

TECHNICAL FIELD

An embodiment relates to a camera actuator and a camera module including the same.

BACKGROUND ART

A camera module performs a function of photographing a subject and storing it as an image or a moving image, and is mounted on a mobile terminal such as a mobile phone and various devices such as a laptop a drone, a vehicle, and the like.

In general, an ultra-small camera module is mounted on the device described above and the camera module may perform an autofocus (AF) function adjusting automatically a distance between an image sensor and a lens to adjust a focal length of the lens. In addition, the camera module may perform a zooming function of zooming up or zooming out photographing a subject by increasing or decreasing a magnification of a long-distance subject through a zoom lens.

Further, recently, a camera module adopts an image stabilization (IS) technology to correct or prevent image shake caused by camera movement due to an unstable fixing device or user movement.

Such an image stabilization (IS) technology includes an optical image stabilizer (OIS) technology and an image stabilization technology using an image sensor. Here, the OIS technology is a technology that corrects movement by changing a light path, and the image stabilization technology using the image sensor is a technology that corrects movement by mechanical and electronic methods, and recently the OIS technology is often used.

The camera module uses a zoom actuator for a zooming function. These actuators move positions of a plurality of zoom lens groups for auto focusing and change of zoom magnification.

In this case, the plurality of zoom lens groups move in the optical axis direction along a rail of a rail guide part coupled to the protrusion of the housing. The housing and the rail guide part may be coupled with an adhesive member applied to a flat surface of the housing. That is, a plurality of protrusions formed on the housing determine a coupling position of the rail guide part and the first lens group, and the coupling position has a very important role in a performance of the camera module.

However, when a rail guide part or a first lens group is fitted to the protrusion of the housing, a conventional camera module has reliability problems such as overflow of the adhesive member applied around the protrusion. In addition, a portion of the adhesive member flows into an accommodation space of the housing due to the overflow of the adhesive member, and there is a problem in that movement of the plurality of zoom lens groups is restricted.

Accordingly, a camera module having a new structure capable of solving the problem of assembly reliability of the housing, the rail guide part, and the first lens group is required.

DISCLOSURE

Technical Problem

An embodiment provides a camera actuator having improved optical characteristics and a camera module including the same.

In addition, the embodiment provides a camera actuator capable of auto focus and high magnification zoom, and a camera module including the same.

In addition, the embodiment provides a camera actuator capable of improving assembly reliability of each component constituting the camera module and a camera module including the same.

In addition, the embodiment provides a camera module capable of solving reliability problems such as aggregation of an adhesive member or overflow into the accommodation space of the housing by designating a flow path of the adhesive member applied to a housing or a rail guide part and a camera device including the same.

Technical Solution

A camera actuator according to an embodiment comprises a moving part including a lens; and a driving part for moving the moving part in the optical axis direction; wherein the driving part includes: a circuit board; a sensing part disposed on the circuit board and sensing a position of the moving part; and a driver IC disposed on the circuit board and connected to the sensing part; wherein the sensing part includes first and second sensing parts, and a distance between the first sensing part and the driver IC corresponds to a distance between the second sensing part and the driver IC.

In addition, the camera actuator further comprises a base; and a rail guide part coupled to the base, wherein the moving part includes second and third lens assemblies disposed in the base and moving along the rail guide part, the first sensing part senses a position of the second lens assembly, and the second sensing part senses a position of the third lens assembly.

In addition, the base includes a first sidewall, a second sidewall facing the first sidewall, and a lower part between the first sidewall and the second sidewall, the circuit board includes a first substrate region corresponding to the first sidewall and on which the first sensing part is disposed; a second substrate region corresponding to the second sidewall and on which the second sensing part is disposed; and a third substrate region corresponding to the lower part and on which the driver IC is disposed.

In addition, the driving part includes a first coil disposed on the first substrate region and surrounding the first sensing part; and a second coil disposed on the second substrate region and surrounding the second sensing part.

In addition, the circuit board includes a first signal line connecting between the first sensing part and the driver IC; a second signal line connecting between the second sensing part and the driver IC; and wherein a length of the first signal line corresponds to a length of the second signal line.

In addition, a length of one of the first and second signal lines satisfies a range of 95% to 105% of a length of the other signal line.

In addition, the rail guide part includes a first guide part disposed adjacent to the first sidewall of the base and including a first rail; and a second guide part disposed adjacent to the second sidewall of the base and including a second rail; wherein the second lens assembly moves along the first rail of the first guide part, and the third lens assembly moves along the second rail of the second guide part.

In addition, the base includes a first opening formed in the first sidewall and corresponding to the first coil; a second opening formed in the second sidewall and corresponding to the second coil; and a third opening formed in the lower part and corresponding to the driver IC.

On the other hand, the camera actuator according to the embodiment comprises a base including a first sidewall, a second sidewall facing the first sidewall, and a lower part between the first sidewall and the second sidewall; a first guide part disposed adjacent to the first sidewall of the base and including a first rail; a second guide part disposed adjacent to the second sidewall of the base and including a second rail; a first lens assembly coupled to the base and fixed; a second lens assembly disposed in the base and moving along the first rail of the first guide part; a third lens assembly disposed in the base and moving along the second rail of the second guide part; and a driving part driving the second lens assembly and the third lens assembly: wherein the driving part includes a circuit board; a first driving part disposed on the circuit board and driving the second lens assembly; a second driving part disposed on the circuit board and driving the third lens assembly; and a driver IC disposed on the circuit board and connected to the first driving part and the second driving part; wherein the circuit board includes a first substrate region corresponding to the first sidewall and on which the first driving part is disposed; a second substrate region corresponding to the second sidewall and on which the second driving part is disposed; and a third substrate region corresponding to the lower part and on which the driver IC is disposed.

In addition, the first driving part includes a first position sensor for sensing a position of the second lens assembly, wherein the second driving part includes a second position sensor for sensing a position of the third lens assembly, and a first distance between the driver IC and the first position sensor is correspond to a second distance between the driver IC and the second position sensor.

In addition, the first distance corresponds to a distance of a first signal line connecting between the driver IC and the first position sensor, and the second distance corresponds to a distance of a second signal line connecting between the driver IC and the second position sensor.

Advantageous Effects

A camera actuator according to an embodiment and a camera module including the same may improve operation reliability. In detail, the camera actuator and camera module according to the embodiment include a circuit board. In addition, a first driving part driving the second lens assembly and a second driving part driving the third lens assembly are disposed on the circuit board. The first driving part includes a first position sensor for sensing a position of a second lens assembly, and the second driving part includes a second position sensor for sensing a position of the third lens assembly. In addition, the circuit board includes a driver IC that controls the first driving part and the second driving part. In this case, the driver IC in the embodiment is disposed on the circuit board together with the first position sensor and the second position sensor. In addition, the driver IC in the embodiment is disposed between the first position sensor and the second position sensor on the circuit board. Specifically, a first distance between the first position sensor and the driver IC on the circuit board corresponds to a second distance between the second position sensor and the driver IC. Specifically, a length of a first signal line connecting between the first position sensor and the driver IC on the circuit board corresponds to a length of a second signal line connecting the second position sensor and the driver IC. Accordingly, the embodiment can minimize the distance between each position sensor and the driver IC, and thereby improve the sensing accuracy by minimizing the effect of noise. In addition, the embodiment allows the driver IC to be disposed on the same circuit board together with the first and second position detection sensors, thereby minimizing an increase in size.

A camera actuator according to an embodiment and a camera module including the same may improve assembly reliability. In detail, the camera actuator and camera module according to the embodiment includes a base recess formed around a coupling protrusion of a base and designating a flow path for an adhesive member. Accordingly, the embodiment can solve a problem that the adhesive member overflows to an inside of the base, thereby improving assembly reliability. Furthermore, the embodiment allows the base recess to include an extension portion extending therefrom, rather than being formed only around the coupling protrusion of the base. Accordingly, the embodiment can further prevent the adhesive member from penetrating into the base, thereby improving product reliability.

In addition, the camera actuator according to the embodiment and the camera module including the same further form a recess around the coupling hole of the rail guide part and accordingly, this prevents overflow of the adhesive member that may occur when the rail guide part and the lens assembly are coupled. In this case, the recess is not formed only around the coupling hole, but includes an additional recess spaced apart from the coupling hole and partitioning a region between the region where the coupling hole is formed and the rail of the rail guide part. Accordingly, the embodiment may prevent the adhesive member from penetrating into the rail of the rail guide part, thereby improving the movement accuracy of the lens assembly.

DESCRIPTION OF DRAWINGS

FIG. 1 is a perspective view of a first camera actuator according to an embodiment.

FIG. 2 is a perspective view of the first camera actuator of FIG. 1 in which some components are omitted.

FIG. 3 is an exploded perspective view of the first camera actuator shown in FIG. 1.

FIG. 4 is an enlarged perspective view of one side of a rail guide part according to an embodiment.

FIG. 5 is an enlarged view of a specific region of the rail guide part of FIG. 4.

FIG. 6 is an enlarged perspective view of the other side of a rail guide part.

FIG. 7 is a perspective view of the second lens assembly shown in FIG. 3.

FIG. 8 is a perspective view of the second lens assembly shown in FIG. 7 in which some components are omitted.

FIG. 9 is a perspective view of the third lens assembly shown in FIG. 3.

FIG. 10 is a perspective view of the third lens assembly shown in FIG. 9 in which some components are omitted.

FIG. 11 is a cross-sectional view in a x-axis direction of the camera module according to the embodiment shown in FIG. 2.

FIG. 12 is an exemplary view of driving a second lens assembly according to an embodiment.

FIG. 13 is a perspective view of a first lens assembly according to an embodiment.

FIG. 14 is a perspective view of the first lens assembly of FIG. 13 in which a first lens group is omitted.

FIG. 15 is a perspective view of a base in a first camera actuator according to an embodiment.

FIG. 16 is a front view of the base shown in FIG. 15.

FIG. 17 is an enlarged view of a region where coupling protrusion of a base is formed.

FIG. 18 is a cross-sectional view of a base, a rail guide part, and a first lens assembly in a coupled state according to an embodiment.

FIGS. 19A to 20B are perspective views illustrating a driving part according to an embodiment.

FIG. 21A is a perspective view of a part of a first driving part shown in FIG. 19.

FIG. 21B is a detailed perspective view of a first yoke of a first driving part according to an embodiment.

FIG. 21C is a bottom perspective view of a first yoke.

FIG. 21D is a perspective view of some components of a first driving part according to a first additional embodiment.

FIG. 21E is a perspective view of some components of a first driving part according to a second additional embodiment.

FIG. 22 is a perspective view of a camera module according to an embodiment.

FIG. 23 is a perspective view of a camera module according to the embodiment in which some components are omitted.

FIG. 24 is an exploded perspective view of a second camera actuator according to an embodiment.

FIG. 25 is a view of a third driving part of a second camera actuator according to an embodiment.

FIG. 26 is a view of a third housing of a second camera actuator according to an embodiment.

FIGS. 27 and 28 are views of a prism unit of a second camera actuator according to an embodiment.

FIG. 29 is a perspective view of a mobile terminal to which a camera module according to an embodiment is applied.

FIG. 30 is a perspective view of a vehicle to which a camera module according to an embodiment is applied.

MODE FOR INVENTION

Hereinafter, embodiments will be described in detail with reference to the accompanying drawings. While the invention may be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

Although the terms "first," "second," etc. may be used to describe various elements, these elements should not be limited by these terms. These terms are only used to distinguish one element from another. In addition, terms defined specially in consideration of a configuration and operation of the embodiment are only for describing the embodiment, and do not limit the scope of the embodiment.

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element.

An optical axis direction used below is defined as an optical axis direction of a camera actuator and a lens coupled to a camera module, and a vertical direction may be defined as a direction perpendicular to the optical axis.

"Auto focus function" used below is defined as a function for automatically adjusting a focus on a subject by adjusting a distance from an image sensor and moving a lens in the optical axis direction according to the distance of the subject so that a clear image of the subject may be obtained on the image sensor.

Meanwhile, "auto focus" may correspond to "AF (Auto Focus)". In addition, a closed-loop auto focus (CLAF) control may be defined as real-time feedback control of the lens position by sensing the distance between the image sensor and the lens to improve focus adjustment accuracy.

In addition, before a description of an embodiment of the present invention, a first direction may mean a x-axis direction shown in drawings, and a second direction may be a different direction from the first direction. For example, the second direction may mean a y-axis direction shown in the drawing in a direction perpendicular to the first direction. Also, a third direction may be different from the first and second directions. For example, the third direction may mean a z-axis direction shown in the drawing in a direction perpendicular to the first and second directions. Here, the third direction may mean an optical axis direction.

Hereinafter, a configuration of the camera module according to a present embodiment will be described with reference to the drawings.

Embodiment

The camera module 10 according to the embodiment may include one or a plurality of actuators. For example, the camera module 10 may include a first camera actuator 1000 and a second camera actuator 2000.

The first camera actuator 1000 may be a zoom and/or auto focus actuator. The first camera actuator 1000 may include a plurality of lens groups. The first camera actuator 1000 may perform a zoom or auto focus function by moving at least one lens in an optical axis direction according to a control signal from a controller (not shown).

The second camera actuator 2000 may be an Optical Image Stabilizer (OIS) actuator. In this case, light incident on the camera module 10 from the outside may be firstly incident on the second camera actuator 2000. In addition, the path of the light incident on the second camera actuator 2000 may be changed to be incident on the first camera actuator 1000. Subsequently, the light passing through the first camera actuator 1000 may be incident to an image sensor (not shown).

Hereinafter, the first camera actuator 1000 according to an embodiment will be described.

—First Camera Actuator—

FIG. 1 is a perspective view of a first camera actuator according to an embodiment, FIG. 2 is a perspective view of the first camera actuator of FIG. 1 in which some components are omitted, and FIG. 3 is an exploded perspective view of the first camera actuator shown in FIG. 1.

Referring to FIG. 1, a first camera actuator 1000 according to an embodiment may include a base 100, a driving part 200 disposed on the base 100, and a first lens assembly 600.

FIG. 2 is a perspective view of the first camera actuator 1000 of FIG. 1 in which the base 100, the first lens assembly 600, and the fourth lens assembly 900 are omitted. Referring to FIG. 2, the first camera actuator 1000 may include a rail guide part 500, a second lens assembly 700 and a third lens assembly 800. The rail guide part 500 may guide the movement of the second lens assembly 700 and the third lens assembly 800 in the base 100. To this end, the rail guide part 500 may include a first guide part 300 for guiding the movement of the second lens assembly 700 and a second guide part 400 for guiding the movement of the third lens assembly 800. In addition, a part of the driving part 200 may be disposed outside (or outer region) the base 100 and the other part may be disposed inside (or inner region) the base 100. The driving part 200 may include a circuit board 210, a first driving part 220 and a second driving part 230. The first driving part 220 may include a first driving coil and a first driving magnet. In addition, the second driving part 230 may include a second driving coil and a second driving magnet. The first driving coil and the first driving magnet of the first driving part 220 may provide a first driving force for moving the second lens assembly 700 along a rail of the first guide part 300 in the optical axis direction. In addition, the second driving coil and the second driving magnet of the second driving part 230 may provide a second driving force for moving the third lens assembly 800 along the rail of the second guide part 400 in the optical axis direction. driving force can be provided. Furthermore, each of the first driving part 220 and the second driving part 230 may further include a yoke (to be described later). This will be described in more detail below.

In the direction of the x-y-z axis shown in FIG. 3, the z-axis means the optical axis direction or a direction parallel thereto, the xz plane means a ground, the x-axis means a direction perpendicular to the z-axis in the ground (xz plane), and the y-axis may mean a direction perpendicular to the ground.

Referring to FIG. 3, the first camera actuator 1000 according to the embodiment may include a base 100, a driving part 200, a rail guide part 500, a first lens assembly 600, a second lens assembly 700, the third lens assembly 800 and the fourth lens assembly 900.

The rail guide part 500 may include a first guide part 300 disposed on one side of the base 100 and a second guide part 400 disposed on the other side of the base 100. The first guide part 300 may correspond to the second lens assembly 700, and the second guide part 400 may correspond to the third lens assembly 800. In addition, a first rolling member (described later) may be disposed between the first guide part 300 and the second lens assembly 700. In addition, a second rolling member (described later) may be disposed between the second guide part 400 and the third lens assembly 800.

The embodiment may include a plurality of lens assemblies. In the plurality of lens assemblies, the first lens assembly 600, the second lens assembly 700, the third lens assembly 800, and the fourth lens assembly 900 may be sequentially disposed from one side. The first lens assembly 600 may be disposed farthest from an image sensor (not shown) or closest to the second camera actuator 2000. In addition, the fourth lens assembly 900 may be disposed closest to the image sensor (not shown) or farthest from the second camera actuator 2000. In addition, the second lens assembly 700 and the third lens assembly 800 may be disposed in the base 100 between the first lens assembly 600 and the fourth lens assembly 900. In this case, the first lens assembly 600 and the fourth lens assembly 900 may be a fixed part having fixed positions. For example, an image sensor (not shown) may be disposed outside the fourth lens assembly 900. A second camera actuator 2000 may be disposed outside the first lens assembly 100.

The second lens assembly 700 and the third lens assembly 800 may be a moving part whose positions are moved.

Hereinafter, each configuration of the first camera actuator 1000 according to the embodiment will be described in detail with reference to the drawings.

<Rail Guide Part>

The embodiment may include a rail guide part 500 for moving the second lens assembly 700 and the third lens assembly 800 in the optical axis direction.

The rail guide part 500 includes a first guide part 300 disposed adjacent to a first sidewall **100*a* of the base 100 and a second guide part 400 disposed adjacent to the second sidewall 100*b* of the base 100**.

The first guide part 300 may be disposed between the second lens assembly 700 and the first sidewall **100*a* of the base 100**.

The second guide part 400 may be disposed between the third lens assembly 800 and the second sidewall **100*b* of the base 100. In this case, the first sidewall 100*a* and the second sidewall 100*b* of the base 100 may face each other. Accordingly, the first guide part 300 and the second guide part 400 may be disposed facing each other in the base 100**.

According to the embodiment, the second lens assembly 700 and the third lens assembly 800 may move (or drive) in a state where the first guide part 300 and the second guide part 400 precisely numerically controlled are coupled in the base 100. Accordingly, the embodiment can reduce the frictional torque and thus reduce the frictional resistance. Accordingly, the embodiment may achieve technical effects such as improvement of driving force during zooming, reduction of power consumption, and improvement of control characteristics.

According to the embodiment, when zooming, it is possible to prevent the occurrence of decentering or tilting of the plurality of lens assemblies and distortion of the central axis of a lens group and an image sensor while minimizing the frictional torque, and accordingly, this may improve image quality or resolution.

For example, when the rail guide part is provided on the base itself, a gradient occurs along an injection direction, which makes it difficult to manage dimensions, and there was a technical problem in that the driving force decreased due to an increase in frictional torque depending on an injection state.

On the other hand, the embodiment allows the base 100 and the rail guide part 500 to be separately employed, and accordingly, it is possible to prevent a gradient from occurring.

For example, the base 100 may be injected in the Z-axis direction. As in the comparative example, when the base and the rail guide part are integrally formed, there is a problem that a straight line of the rail is distorted due to the occurrence of a gradient as the rail is ejected in the Z-axis direction.

According to the embodiment, it is possible to prevent the occurrence of a gradient compared to the comparative example as the first guide part 300 and the second guide part 400 are injected separately from the base 100, thereby allowing precise injection.

In addition, in the embodiment, the first guide part 300 and the second guide part 400 are injected in the X-axis, and an injection length may be shorter than that of the base 100. Accordingly, the embodiment can prevent the problem of twisting of the rails respectively formed on the first guide part 300 and the second guide part 400.

FIG. 4 is an enlarged perspective view of one side of a rail guide part according to an embodiment, FIG. 5 is an enlarged view of a specific region of the rail guide part of FIG. 4, and FIG. 6 is an enlarged perspective view of the other side of a rail guide part.

Referring to FIGS. 4 and 5, the rail guide part 500 includes a first guide part 300 and a second guide part 400.

The first guide part 300 may include a single or a plurality of first rails 310. In addition, the second guide part 400 may include a single or a plurality of second rails 410.

For example, the first rail 310 of the first guide part 300 may include a first-first rail 311 and a first-second rail 312. The first guide part 300 may include a first supporting part 320 between the first-first rail 311 and the first-second rail 312.

In addition, the second rail 410 of the second guide part 400 may include a second-first rail 411 and a second-second rail 412. The second guide part 400 may include a second supporting part 420 between the second-first rail 411 and the second-second rail 412.

According to the embodiment, each of the first guide part 300 and the second guide part 400 includes a plurality of rails. Accordingly, each of the second lens assembly 700 and the third lens assembly 800 according to the embodiment may move along the plurality of rails in the optical axis direction.

According to this embodiment, since each guide part is provided with two rails, it is possible to secure the movement accuracy of the lens assembly with the other guide part even when distortion of one rail occurs.

In addition, according to the embodiment, each guide part has two rails, so that even if an issue of frictional force of a rolling member (to be described later) occurs on one rail, the rolling drive proceeds smoothly on the other rail. Accordingly, the driving force can be secured.

The first rail 310 may be connected from one surface (or one side) of the first guide part 300 to the other surface (or other side). Preferably, the first rail 310 may be formed to extend in the optical axis direction from the first guide part 300.

The second rail 410 may be connected from one surface (or one side) of the second guide part 400 to the other surface (or other side). Preferably, the second rail 410 may be formed to extend in the optical axis direction from the second guide part 400.

Accordingly, the camera actuator according to the embodiment and the camera module including the same may maintain an alignment state and distance between a plurality of lens groups by solving the problem of lens decentering or tilting during zooming, and it can solve reliability problems such as angle of view change or out of focus.

Specifically, according to the embodiment, the first guide part 300 includes a first-first rail 311 and a first-second rail 312, and accordingly alignment accuracy can be improved by guiding the movement of the second lens assembly 700 by the first-first rail 311 and the first-second rail 312. In addition, according to the embodiment, the second guide part 400 includes a second-first rail 411 and a second-second rail 412, and accordingly alignment accuracy can be improved by guiding the movement of the third lens assembly 800 by the second-first rail 411 and the second-second rail 412.

In addition, according to the embodiment, since each guide part has two rails, it is possible to maximize a distance of the rolling member to be described later. Accordingly, the embodiment can prevent magnetic field interference while improving the driving force for the movement of the second lens assembly 700 and the third lens assembly 800, thereby preventing the tilt of the lens assembly in a stationary or moving state.

The first guide part 300 may include a first guide protrusion 330 extending in a lateral direction perpendicular to an extending direction of the first rail 310. For example, the first rail 310 may extend in the z-axis direction, and the first guide protrusion 330 may extend in the x-axis direction from one side of the first rail 310.

A first coupling hole 340 may be formed on the first guide protrusion 300. A plurality of first coupling holes 340 may be formed on the first guide protrusion 300. For example, the first coupling hole 340 may include a first-first coupling hole 341 and a first-second coupling hole 342 spaced apart in the y-axis direction on the first guide protrusion 300. The first-first coupling hole 341 and the first-second coupling hole 342 may have different shapes. For example, the first-first coupling hole 341 may be formed in a circular shape, and the first-second coupling hole 342 may be formed in an elliptical shape.

The second guide part 400 may include a second guide protrusion 430 extending in a lateral direction perpendicular to an extending direction of the second rail 410. For example, the second rail 410 may extend in the z-axis direction, and the second guide protrusion 430 may extend in the x-axis direction from one side of the second rail 510.

A second coupling hole 440 may be formed on the second guide protrusion 400. A plurality of second coupling holes 440 may be formed on the second guide protrusion 400. For example, the second coupling hole 440 may include a second-first coupling hole 441 and a second-second coupling hole 442 spaced apart in the y-axis direction on the second guide protrusion 400. The second-first coupling hole 441 and the second-second coupling hole 442 may have different shapes. For example, the second-first coupling hole 441 may be formed in an elliptical shape, and the second-second coupling hole 442 may be formed in a circular shape.

In this case, coupling holes adjacent to each other in the first coupling hole 340 and the second coupling hole 440 may have different shapes. For example, the first-first coupling hole 341 of the first coupling hole 340 may have a circular shape, and the second-first coupling hole 441 of the second coupling hole 440 adjacent thereto may have an elliptical shape. For example, the first-second coupling hole 342 of the first coupling hole 340 may have an elliptical shape, and the second-second coupling hole 442 of the second coupling hole 440 adjacent thereto may have a circular shape.

In addition, coupling holes positioned in a diagonal direction from each other in the first coupling hole 340 and the second coupling hole 440 may have the same shape as each other. For example, the first-first coupling hole 341 of the first coupling hole 340 may be circular, and the second-second coupling hole 442 of the second coupling hole 440 located in a diagonal direction of the first-first coupling hole may be circular. For example, the first-second coupling hole 342 of the first coupling hole 340 may have an elliptical shape, and the second-first coupling hole 441 of the second coupling hole 440 positioned in a diagonal direction of first-second coupling hole may have an elliptical shape. Here, a coupling hole having a circular shape may be referred to as a regular-hole, and a coupling hole having an elliptical shape may be referred to as a long-hole.

When the first guide part 300/second guide part 400 and the base 100 are coupled, the first-first coupling hole 341 and the second-second coupling hole 442, the first-first coupling hole 341 and the second-second coupling hole 442, which are a regular hole with a circular shape, can firmly couple the first guide part 300 to the base 100. In addition, when the first guide part 300/second guide part 400 and the base 100 are coupled, the first-second coupling hole 342 and the second-first coupling hole 441, which are a lone hole with an elliptical shape, can prevent rotation in the x-axis direction while covering fine assembly tolerances occurring in the y-axis direction. Accordingly, the first-second coupling hole 342 and the second-first coupling hole 441, which are a lone hole with an elliptical shape, may have a shape extending along the y-axis compared to the first-first coupling hole 341 and the second-second coupling hole 442.

For example, diameters of the first-second coupling hole 342 and the second-first coupling hole 441 in the x-axis direction may be the same as diameters of the first-first coupling hole 341 and the second-second coupling hole 442 in the x-axis direction. In addition, diameters of the first-second coupling hole 342 and the second-first coupling hole 441 in the y-axis direction may be greater than diameters of the first-first coupling hole 341 and the second-second coupling hole 442 in the y-axis direction.

Meanwhile, the first guide part 300 according to the embodiment may include a plurality of recesses for designating a flow path of an adhesive member (not shown). Correspondingly, the second guide part 400 may include a plurality of recesses for designating a flow path of an adhesive member (not shown). The adhesive member may be a bonding member applied when the first guide part 300/second guide part 400 and the base 100 are coupled.

For example, according to the embodiment, the first guide part 300 may include a first-first recess 391 formed around the first-first coupling hole 341. The first-first recess 391 may have a shape corresponding to the first-first coupling hole 341. A size of the first-first recess 391 may be greater than a size of the first-first coupling hole 341. For example, a width of the first-first recess 391 in the x-axis direction may be greater than a width of the first-first coupling hole 341 in the x-axis direction. For example, a width of the first-first recess 391 in the y-direction may be greater than a width of the first-first coupling hole 341 in the y-direction. For example, the first-first coupling hole 341 may be formed in the first-first recess 391.

When the first lens assembly 600 and the first guide part 300 are coupled, the first-first recess 391 may designate a flow path of an adhesive member (not shown) applied around the first-first coupling hole 341. For example, the first-first recess 391 may function as a dam to prevent overflow of an adhesive member (not shown) applied around the first-first coupling hole 341. For example, when the first-first recess 391 is not formed, an overflow of the adhesive member (not shown) may occur in a process of coupling the first lens assembly 600 on the first guide part 300, and accordingly, the adhesive member (not shown) may move toward the first rail 310 of the first guide part 300. In addition, the adhesive member (not shown) that has moved toward the first rail 310 may interfere with the movement of the second lens assembly 700, and as a result, a problem may occur in the operation reliability of the first camera actuator 1000. Therefore, a first-first recess 391 in the embodiment is formed around the first-first coupling hole 341 to prevent the adhesive member (not shown) from overflowing.

In addition, the first guide part 300 of the embodiment may include a first-second recess 392 formed around the first-second coupling hole 342. The first-second recess 392 may have a shape corresponding to the first-second coupling hole 342. A size of the first-second recess 392 may be greater than a size of the first-second coupling hole 342. For example, a width of the first-second recess 392 in the x-axis direction may be greater than a width of the first-second coupling hole 342 in the x-axis direction. For example, a width of the first-second recess 392 in the y-direction may be greater than a width of the first-second coupling hole 342 in the y-direction. For example, the first-second coupling hole 342 may be formed in the first-second recess 392.

When the first lens assembly 600 and the first guide part 300 are coupled, the first-second recess 392 may designate a flow path of an adhesive member (not shown) applied around the first-second coupling hole 342. For example, the first-second recess 392 may function as a dam to prevent overflow of an adhesive member (not shown) applied around the first-second coupling hole 342.

In addition, the first guide part 300 of the embodiment may include a first-third recess 393. The first-third recess 393 may have a shape extending in the y-axis direction from the first guide part 300. The first-third recess 393 may be formed between the first coupling hole 340 and the first rail 310. For example, the first-third recess 393 may be formed to elongate in the y-axis direction between the first coupling hole 340 and the first rail 310. The first-third recess 393 may additionally block overflow of an adhesive member (not shown) from the first-first recess 391 or the first-second recess 392. For example, the inner side (specifically, the first rail) of the first guide part 300 may be a part that plays the most important role in operation reliability of the first camera actuator 1000. In this case, overflow of the adhesive member (not shown) may occur even in a state where the first-first recess 391 and the first-second recess 392 are formed. Accordingly, the embodiment may further block the flow of the adhesive member (not shown) to the inside of the first guide part 300, specifically to the first rail 310.

The first guide part 300 of the embodiment forms a recess around the first coupling hole 340 to primarily block the overflow of an adhesive member (not shown), and forms a recess between the first coupling hole 340 and the first rail 310 to secondarily block the overflow of an adhesive member (not shown). Accordingly, the embodiment can fundamentally block the flow of the adhesive member (not shown) toward the inside of the first guide part 300 (or toward the first rail), thereby improving operation reliability.

In addition, according to the embodiment, the second guide part 400 may include a second-first recess 491 formed around the second-first coupling hole 441. The second-first recess 491 may have a shape corresponding to the second-first coupling hole 441. A size of the second-first recess 491 may be greater than a size of the second-first coupling hole 441. For example, a width of the second-first recess 491 in the x-axis direction may be greater than a width of the second-first coupling hole 441 in the x-axis direction. For example, a width of the second-first recess 491 in the y-direction may be greater than a width of the second-first coupling hole 441 in the y-direction. For example, the second-first coupling hole 441 may be formed in the second-first recess 491.

When the first lens assembly 600 and the second guide part 400 are coupled, the second-first recess 491 may designate a flow path of an adhesive member (not shown) applied around the second-first coupling hole 441. For example, the second-first recess 491 may function as a dam to prevent overflow of an adhesive member (not shown) applied around the second-first coupling hole 441. For example, when the second-first recess 491 is not formed, an overflow of the adhesive member (not shown) may occur in a process of coupling the first lens assembly 600 on the second guide part 400, and accordingly, the adhesive member (not shown) may move toward the second rail 410 of the second guide part 400. In addition, the adhesive member (not shown) that has moved toward the second rail 410 may interfere with the movement of the third lens assembly 800, and as a result, a problem may occur in the operation reliability of the first camera actuator 1000. Therefore, a second-first recess 491 in the embodiment is formed around the second-first coupling hole 441 to prevent the adhesive member (not shown) from overflowing.

In addition, the second guide part 400 of the embodiment may include a second-second recess 492 formed around the second-second coupling hole 442. The second-second recess 492 may have a shape corresponding to the second-second coupling hole 442. A size of the second-second recess 492 may be greater than a size of the second-second coupling hole 442. For example, a width of the second-second recess 492 in the x-axis direction may be greater than a width of the second-second coupling hole 442 in the x-axis direction. For example, a width of the second-second recess 492 in the y-direction may be greater than a width of the second-second coupling hole 442 in the y-direction. For example, the second-second coupling hole 442 may be formed in the second-second recess 492.

When the first lens assembly 600 and the second guide part 400 are coupled, the second-second recess 492 may designate a flow path of an adhesive member (not shown) applied around the second-second coupling hole 442. For example, the second-second recess 492 may function as a dam to prevent overflow of an adhesive member (not shown) applied around the second-second coupling hole 442.

In addition, the second guide part 400 of the embodiment may include a second-third recess 493. The second-third recess 493 may have a shape extending in the y-axis direction from the second guide part 400. The second-third recess 493 may be formed between the second coupling hole 440 and the second rail 410. For example, the second-third recess 493 may be formed to elongate in the y-axis direction between the second coupling hole 440 and the second rail 410. The second-third recess 493 may additionally block overflow of an adhesive member (not shown) from the second-first recess 491 or the second-second recess 492. For example, the inner side (specifically, the second rail) of the second guide part 400 may be a part that plays the most important role in operation reliability of the first camera actuator 1000. In this case, overflow of the adhesive member (not shown) may occur even in a state where the second-first recess 491 and the second-second recess 492 are formed. Accordingly, the embodiment may further block the flow of the adhesive member (not shown) to the inside of the second guide part 400, specifically to the second rail 410.

The second guide part 400 of the embodiment forms a recess around the second coupling hole 440 to primarily block the overflow of an adhesive member (not shown), and forms a recess between the second coupling hole 440 and the second rail 410 to secondarily block the overflow of an adhesive member (not shown). Accordingly, the embodiment can fundamentally block the flow of the adhesive member (not shown) toward the inside of the second guide part 400 (or toward the second rail), thereby improving operation reliability.

Meanwhile, the first rail 310 of the first guide part 300 may include a plurality of rails having different shapes. That is, as described above, the first rail 310 may include a first-first rail 311 and a first-second rail 312.

Also, the first-first rail 311 may have a first shape. Also, the first-second rail 312 may have a second shape different from the first shape.

In addition, the second rail 410 of the second guide part 400 may include a plurality of rails having different shapes. That is, as described above, the second rail 410 may include a second-first rail 411 and a second-second rail 412.

Also, the second-first rail 411 may have a second shape. Also, the second-second rail 412 may have a first shape different from the second shape.

Here, the first shape of the first-first rail 311 may be a V shape. In addition, the first shape of the second-second rail 412 may be a V shape. Also, the second shape of the first-second rail 312 and the second shape of the second-second rail 412 may be 'L' shapes. However, the embodiment is not limited thereto, and the first shape and the second shape may have different shapes other than the 'V' and 'L' shapes.

In this case, the rails having the same shape as each other in the first rail 310 and the second rail 410 may be positioned in a diagonal direction. For example, the first-first rail 311 of the first rail 310 having the first shape and the second-second rail 412 of the second rail 410 may be positioned in a diagonal direction. For example, the first-second rail 312 of the first rail 310 having the second shape and the second-first rail 411 of the second rail 410 may be positioned in a diagonal direction.

Meanwhile, a single or a plurality of first ribs 350 may be formed inside the first supporting part 320 of the first guide part 300. For example, a first rib 350 may be formed between the first-first rail 311 and the second rail 312 of the first guide part 300. The first rib 350 may improve the accuracy of dimensional management of the first-first rail 311 and the second rail 312.

In the comparative example, shrinkage occurs as the amount of injection molding increases or the thickness of injection molding increases, which makes it difficult to manage dimensions, and when the amount of injection molding is reduced, there is a problem in that the strength is weakened.

In contrast, in the embodiment, the first rib 350 is provided inside the first supporting part 320, and it is possible to secure strength while reducing the amount of injection molding and increasing the accuracy of dimension management. In addition, a single or a plurality of second ribs (not shown) may be formed inside the second supporting part 420 of the second guide part 400.

In addition, the second guide part 400 may include a rail part recess 470 and a supporting part recess 480. For example, a second rail 410 is formed inside the second guide part 400. Also, a rail part recess 470 may be formed on an outer side opposite to the second rail 410 of the second guide part 400. In addition, a supporting part recess 480 may be formed outside the second supporting part 420 of the second guide part 400. The rail part recess 470 and the supporting part recess 480 prevents shrinkage by reducing the injection amount of the second guide part 400, and it is possible to secure strength while increasing the accuracy of dimension management.

Also, a rail part recess (not shown) and a supporting part recess (not shown) of the first guide part may also be formed outside the first guide part 300 corresponding to the second guide part 400.

Meanwhile, the first guide part 300 may include a first guide protrusion 360 formed in a region opposite to the first coupling hole 340. Specifically, the first guide part 300 may include a first-first guide protrusion 361 formed in a region opposite to the first-first coupling hole 341 and a first-second guide protrusion 362 formed in a region opposite to the first-second coupling hole 342. The first guide protrusion 361 and the second guide protrusion 362 may be fitted into a coupling recess of a third sidewall 100*c* of the base 100 to be described later.

In addition, the second guide part 400 may include a second guide protrusion 460 formed in a region opposite to the second coupling hole 440. Specifically, the second guide part 400 may include a second-first guide protrusion 461 formed in a region opposite to the second-first coupling hole 441 and a second-second guide protrusion 462 formed in a region opposite to the second-second coupling hole 442. The second-first guide protrusion 461 and the second-second guide protrusion 462 may be fitted into a coupling recess of the third sidewall 100*c* of the base 100 to be described later.

<Second Lens Assembly, Third Lens Assembly, First Rolling Member and Second Rolling Member>

Hereinafter, the second lens assembly 700, the third lens assembly 800, the first rolling member, and the second rolling member will be described in detail.

FIG. 7 is a perspective view of the second lens assembly shown in FIG. 3, FIG. 8 is a perspective view of the second lens assembly shown in FIG. 7 in which some components are omitted, FIG. 9 is a perspective view of the third lens assembly shown in FIG. 3, and FIG. 10 is a perspective view of the third lens assembly shown in FIG. 9 in which some components are omitted.

For a moment, referring to FIG. 3, the embodiment may include a second lens assembly 700 moving along the first guide part 300 and a third lens assembly 800 moving along the second guide part 400.

Referring to FIGS. 7 and 8, the second lens assembly 700 may include a second lens barrel 710 on which a second lens group 730 is disposed, and a first driving part housing 720 in which a part of the driving part 200 (specifically, the first magnet and the first yoke of the first driving part) is disposed. In this case, the second lens barrel 710 and the first driving part housing 720 may be a first housing. Also, the first housing may have a barrel or barrel shape. The first driving part housing 720 may be a first magnet/yoke disposition part in which a first magnet 222 and a first yoke 223 of the first driving part 220 constituting the driving part 200 are disposed. However, it is not limited thereto, and may be a disposition part of the first coil 221 according to an embodiment.

Referring to FIGS. 8 and 9, the third lens assembly 800 includes a third lens barrel 810 on which a third lens group 830 is disposed, and a second driving part housing 820 in which a part of the driving part 200 (specifically, the second magnet and the second yoke of the second driving part) is disposed. In this case, the third lens barrel 810 and the second driving part housing 820 may be the second housing. And, the second housing may have a barrel or barrel shape. The second driving part housing 820 may be a second magnet/yoke disposition part in which the second magnet 232 and the second yoke 233 of the second driving part 230 constituting the driving part 200 are disposed. However, it is not limited thereto, and may be a disposition part of the second coil 231 of the second driving part 230 according to an embodiment.

The second lens assembly 700 corresponds to the two first rails 310 of the first guide part 300, and the third lens assembly 800 corresponds to the two second rails 410 of the second guide part 400.

An embodiment may include a first rolling member 740 and a second rolling member 840. The first rolling member 740 may include a single ball or a plurality of balls. The second rolling member 840 may include a single ball or a plurality of balls.

The embodiment may include a first rolling member 740 disposed between the second lens assembly 700 and the first guide part 300. Also, the embodiment may include a second rolling member 840 disposed between the third lens assembly 800 and the second guide part 400.

The first rolling member 740 may includes a single or a plurality of first balls 741 disposed on an upper side of the first driving part housing 720 and a single or a plurality of second balls 742 disposed on a lower side of the first driving part housing 720. The first ball 741 may move along a first-first rail 311, which is one of the first rails 310 of the first guide part 300. In addition, the second ball 742 may move along the first-second rail 312, which is another one of the first rails 310 of the first guide part 300. The first ball 741 corresponds to the first-first rail 311 and may include a first-first ball 741*a* and a first-second ball 741*b* spaced apart from each other by a predetermined distance. In addition, the second ball 742 corresponds to the first-second rail 312 and may include a second-first ball 742*a* and a second-second ball 742*b* spaced apart from each other by a predetermined distance.

The second rolling member 840 may includes a single or a plurality of third balls 841 disposed on an upper side of the second driving part housing 820 and a single or plurality of fourth balls 842 disposed on a lower side of the second driving part housing 820. The third ball 841 may move along a second-first rail 411, which is one of the second rails 410 of the second guide part 400. In addition, the fourth ball 842 may move along the second-second rail 412, which is another one of the second rails 410 of the second guide part 400. The third ball 841 corresponds to the second-first rail 411 and may include a third-first ball 841*a* and a third-second ball 841*b* spaced apart from each other by a predetermined distance. In addition, the fourth ball 842 may include a fourth-first ball 842*a* and a fourth-second ball 842*b* that correspond to the second-second rail 412 and are spaced apart from each other by a predetermined distance.

The camera actuator according to the embodiment and the camera module including the same may maintain an alignment state and distance between a plurality of lens groups by solving the problem of lens decentering or tilting during zooming, and it is possible to improve image quality by solving problems such as change in angle of view or out of focus.

For example, in the embodiment, the first guide part 300 includes a first-first rail and a first-second rail, and the first-first rail and the first-second rail guide the movement of the second lens assembly 700. Accordingly, when the second lens assembly 700 moves, it can improve the accuracy of optical axis alignment with the third lens assembly 800.

Meanwhile, the second lens assembly 700 may include a first ball recess 750 in which a first rolling member 740 is disposed. Also, the third lens assembly 800 may include a second ball recess 850 in which the second rolling member 840 is disposed.

The number of the first ball recess 750 and the second ball recess 850 may be plural. For example, the number of first ball recesses 750 may correspond to the number of balls constituting the first rolling member 740. Also, the number of second ball recesses 850 may correspond to the number of balls constituting the second rolling member 840. For example, the first ball recess 750 may include four recesses spaced apart from each other to correspond to the first rolling member 740. For example, the second ball recess 850 may include four recesses spaced apart from each other to correspond to the second rolling member 840.

In this case, a distance between two recesses among four recesses constituting the first ball recess 750 may be greater than the thickness of the second lens barrel 710 based on the optical axis direction.

Also, a distance between two recesses among four recesses constituting the second ball recess 850 may be greater than a thickness of the third lens barrel 810 based on the optical axis direction.

In an embodiment, the first ball recess 750 of the second lens assembly 700 may have a V shape. Also, the second ball recess 850 of the third lens assembly 800 may have a V shape. However, it is not limited thereto, and the first ball recess 750 and the second ball recess 850 may have a U-shape or a shape in contact with the ball at two or three points.

Also, a first driving part disposition recess 770 may be formed in a region between the first ball recess 750 in the second lens assembly 700. Also, a second driving part disposition recess 870 may be formed in a region between the second ball recesses 850 in the third lens assembly 800.

FIG. 11 is a cross-sectional view in a x-axis direction of the camera module according to the embodiment shown in FIG. 2.

Referring to FIG. 11, a first guide part 300 and a second guide part 400 may be respectively inserted and disposed in the base 100, and the second lens assembly 700 may be disposed to correspond to the first guide part 300, and the third lens assembly 800 may be disposed to correspond to the second guide part 400.

In addition, a first rolling member 740 may be inserted between the first rail 310 of the first guide part 300 and the second lens assembly 700. In addition, a second rolling member 840 may be inserted between the second rail 410 of the second guide part 400 and the third lens assembly 800.

The second lens assembly 700 may move along the first rail 310 of the first guide part 300 in the optical axis direction through the first rolling member 740. In addition, the third lens assembly 800 may move along the second rail 410 of the second guide part 400 in the optical axis direction through the second rolling member 840.

Meanwhile, the embodiment has an effect of preventing the second lens assembly 700 and the second lens assembly 700 from being reversely inserted into the base 100. For example, the embodiment may solve a problem of mis-insertion in which the third lens assembly 800 is disposed where the second lens assembly 700 is to be disposed and a problem of mis-insertion in which the second lens assembly 700 is disposed where the third lens assembly 800 is to be disposed.

For example, upper and lower widths of the second lens assembly 700 may have a first width A10. In addition, upper and lower widths of the third lens assembly 800 may have a second width B10 different from the first width A10. Accordingly, the embodiment may allow the third lens assembly 800 not to be inserted in a region where the second lens assembly 700 is to be disposed by the dimension design of the second lens assembly 700 and the third lens assembly 800 as described above, thereby improving reliability.

FIG. 12 is an exemplary view of driving a second lens assembly according to an embodiment.

Referring to FIG. 12, an interaction in which an electromagnetic force DEM is generated between a first magnet 116 and a first coil part 141*b* of a first driving part 220 in the camera module according to the embodiment will be described.

As shown in FIG. 12, a magnetization method of the first magnet 222 of the first camera actuator 1000 according to an embodiment may be a perpendicular magnetization method. For example, in the embodiment, both the N pole 222N and the S pole 222S of the first magnet 222 may be magnetized to face the first coil 221.

Accordingly, the N pole 222N and the S pole 222S of the first magnet 222 may be respectively disposed to correspond to a region in which a current flows in a y-axis direction perpendicular to the ground in the first coil 221.

Then, a magnetic force DM is applied in an opposite direction to the x-axis from the N pole 222N of the first magnet 222 (a direction of the magnetic force may be a positive or negative direction of the illustrated direction), when a current DE flows in the y-axis direction in a region of the first coil 221 corresponding to the N pole 222N, the electromagnetic force DEM acts in the z-axis direction according to Fleming's left-hand rule.

In addition, in the embodiment, a magnetic force DM is applied in the x-axis direction from the S pole 222S of the first magnet 222, when a current DE flows in the opposite direction of the y-axis perpendicular to the ground in the first coil 221 corresponding to the S pole 222S, the electromagnetic force DEM acts in the z-axis direction according to Fleming's left-hand rule (The direction of the electromagnetic force may be positive or negative of the illustrated direction).

In this case, the first coil 221 of the first driving part 220 is in a fixed state, and accordingly, the second lens assembly 700, which is a mover in which the first magnet 222 of the first driving part 220 is disposed, may move back and forth along the first rail 310 of the first guide part 300 in a direction parallel to the z-axis direction by the electromagnetic force (DEM) according to a current direction. In this case, the electromagnetic force DEM may be controlled in proportion to the current DE applied to the first coil 221.

Likewise, an electromagnetic force (DEM) is generated between the second coil 231 and the second magnet 232 of the second driving part 230 in the camera module according to the embodiment, so that the third lens assembly 800 on which the second magnet 232 is disposed may move along the second rail 410 of the second guide part 400 in a direction parallel to the optical axis.

<First Lens Assembly>

FIG. 13 is a perspective view of a first lens assembly according to an embodiment, and FIG. 14 is a perspective view of the first lens assembly of FIG. 13 in which a first lens group is omitted.

Referring to FIG. 13, a first lens assembly 600 may include a first lens barrel 610 and a first lens group 620.

In an embodiment, the third lens assembly 800 may have a barrel part recess 611*r* formed on the first lens barrel 610. The barrel part recess 611*r* can uniformly adjust a thickness of the first lens barrel 610 of the first lens assembly 600 and increase the accuracy of numerical control by reducing the amount of the injected material.

In addition, according to the embodiment, the first lens barrel 610 may include a plurality of ribs 630. The plurality of ribs 630 may improve the strength of the first lens barrel 610.

In addition, the plurality of ribs 630 may be a stopper coupling part to which a stopper (not shown) is coupled. For example, stoppers (not shown) may be coupled to each of the plurality of ribs 630. The stopper (not shown) may be disposed between the first lens assembly 600 and the second lens assembly 700 to limit the movement of the second lens assembly 700. For example, when the second lens assembly 700 moves in a direction in which the first lens assembly 600 is disposed, the movement of the second lens assembly 700 may be restricted by the stopper.

In addition, the third lens barrel 610 may include a lens insertion part 612*h* into which the third lens group 620 is inserted. The lens insertion part 612*h* may have a hole shape passing through the third lens barrel 610 in an optical axis direction.

Meanwhile, the third lens assembly 800 may include a plurality of coupling holes.

The first lens assembly 600 may include a third coupling hole 640 and a fourth coupling hole 650.

The third coupling hole 640 may correspond to the first coupling hole 340 of the first guide part 300. The third coupling hole 640 may include a third-first coupling hole 641 and a third-second coupling hole 642 spaced apart in the y-axis direction on one side of the third lens barrel 810 of the third lens assembly 800. The third-first coupling hole 641 and the third-second coupling hole 642 may have different shapes. For example, the third-first coupling hole 641 may be formed in a circular shape, and the third-second coupling hole 642 may be formed in an elliptical shape. The third coupling hole 640 may be aligned with the first coupling hole 340 in an optical axis direction. For example, a center of the third coupling hole 640 may be aligned with a center of the first coupling hole 340 in the optical axis direction. A protrusion of the base 100 described later may be inserted into the third coupling hole 640.

The fourth coupling hole 650 may correspond to the second coupling hole 440 of the second guide part 400. The fourth coupling hole 6500 includes a fourth-first coupling hole 651 and a fourth-second coupling hole 652 spaced apart in the y-axis direction on the other side of the third lens barrel 810 of the third lens assembly 800. The fourth-first coupling hole 651 and the fourth-second coupling hole 652 may have different shapes. For example, the fourth-first coupling hole 651 may be formed in an elliptical shape, and the fourth-second coupling hole 652 may be formed in a circular shape.

In this case, coupling holes adjacent to each other in the x-axis direction in the third coupling hole 640 and the fourth coupling hole 650 may have different shapes. For example, the third-first coupling hole 641 of the third coupling hole 640 has a circular shape, and the fourth-first coupling hole 651 of the fourth coupling hole 650 adjacent to third-first coupling hole in the x-axis direction has an elliptical shape. For example, the third-second coupling hole 642 of the third coupling hole 640 has an elliptical shape, and the fourth-second coupling hole 652 of the fourth coupling holes 650 adjacent to the third-second coupling hole in the x-axis direction may have a circular shape.

In addition, coupling holes positioned in a diagonal direction in the third coupling hole 640 and the fourth coupling hole 650 may have the same shape. For example, the third-first coupling hole 641 of the third coupling hole 640 may have a circular shape, and the fourth-second coupling hole 652 of the fourth coupling hole 650 positioned in a diagonal direction with the third-first coupling hole may have a circular shape. For example, the third-second coupling hole 642 of the third coupling hole 640 may have an elliptical shape, and the fourth-first coupling hole 651 of the fourth coupling hole 650 located in a diagonal direction with the third-second coupling hole may have an elliptical shape. Here, a coupling hole having a circular shape may be referred to as a regular hole, and a coupling hole having an elliptical shape may be referred to as a long hole.

When the first lens assembly 600 and the base 100 are coupled, the third-first coupling hole 641 and the fourth-second coupling hole 652, which are a regular hole with a circular shape, may firmly couple the first lens assembly 600 to the base 100. When the first lens assembly 600 and the base 100 are coupled, the third-second coupling hole 642 and the fourth-first coupling hole 651, which are a lone hole with an elliptical shape, can prevent rotation in the x-axis direction while covering fine assembly tolerances occurring in the y-axis direction. Accordingly, the third-second coupling hole 642 and the fourth-first coupling hole 651, which are a lone hole with an elliptical shape, may have a shape extending along the y-axis compared to the third-first coupling hole 641 and the fourth-second coupling hole 652.

For example, diameters of the third-second coupling hole 642 and the fourth-first coupling hole 651 in the x-axis direction may be a same as diameters of the third-first coupling hole 641 and the fourth-second coupling hole 652 in the x-axis direction. In addition, diameters of the third-second coupling hole 642 and the fourth-first coupling hole 651 in the y-axis direction may be greater than diameters of the third-first coupling hole 641 and the fourth-second coupling hole 652 in the y-axis direction.

<Base>

FIG. 15 is a perspective view of a base in a first camera actuator according to an embodiment, FIG. 16 is a front view of the base shown in FIG. 15, FIG. 17 is an enlarged view of a region where coupling protrusion of a base is formed, and FIG. 18 is a cross-sectional view of a base, a rail guide part, and a first lens assembly in a coupled state according to an embodiment.

Referring to FIG. 3, a first guide part 300, a second guide part 400, a second lens assembly 700 and a third lens assembly 800 may be accommodated in the base 100. Also, the first lens assembly 600 may be disposed spaced apart from the second lens assembly 700 on one side surface of the base 100. Also, the fourth lens assembly 900 may be disposed spaced apart from the third lens assembly 800 on the other side surface of the base 100.

Referring to FIGS. 15 to 18, the base 100 may include a plurality of side walls.

For example, the base 100 may include a first sidewall 100*a*, a second sidewall 100*b*, a third sidewall 100*c*, and a fourth sidewall 100*d*. In addition, the base 100 may include an upper part 100*e* and a lower part 100*f* together with the plurality of side wall.

The base 100 may include a first sidewall 100*a* and a second sidewall 100*b* corresponding to the first sidewall 100*a*. For example, the second sidewall 100*b* may be disposed in a direction facing the first sidewall 100*a*. The first sidewall 100*a* and the second sidewall 100*b* may include a first opening OA1 and a second opening OA2, respectively. The first opening OA1 may be an insertion space into which a part of the driving part 200 disposed outside the first sidewall 100*a* of the base 100 is inserted. For example, the circuit board 210 of the driving part 200 is disposed outside the first sidewall 100*a*. Also, the first coil 221 of the first driving part 220 may be disposed on the circuit board 210. In this case, the first coil 221 of the first driving part 220 may be disposed inside the base 100 through the first opening OA1 formed in the first sidewall 100*a* in a state where the circuit board 210 is disposed outside the first sidewall 100*a* of the base 100. Also, the second opening OA2 may be an insertion space into which a part of the second driving part 230 disposed outside the second sidewall 100*b* of the base 100 is inserted. For example, the circuit board 210 of the driving part 200 is disposed outside the second sidewall 100*b*. In this case, the second coil 231 of the second driving part 230 may be disposed inside the base 100 through the second opening OA2 formed in the second sidewall 100*b* in a state where the circuit board 210 is disposed outside the second sidewall 100*b* of the base 100.

The base 100 may include a third sidewall 100*c* disposed between the first sidewall 100*a* and the second sidewall 100*b* and connecting the first sidewall 100*a* and the second sidewall 100*b*. The third sidewall 100*c* may be disposed in a direction perpendicular to the first sidewall 100*a* and the second sidewall 100*b*. The first sidewall 100*a*, the second sidewall 100*b*, and the third sidewall 100*c* may be integrally injected or separately injected.

A coupling protrusion may be formed on the fourth sidewall 100*d* of the base 100.

Specifically, a first coupling protrusion 110 and a second coupling protrusion 120 may be formed on the fourth sidewall 100*d* of the base 100.

The first coupling protrusion 110 may be a protrusion to which the first guide part 300 is coupled. For example, the first coupling protrusion 110 may correspond to the first coupling hole 340 of the first guide part 300. Accordingly, the first coupling protrusion 110 may include a first-first coupling protrusion 111 corresponding to the first-first coupling hole 341 of the first guide part 300 and a first-second coupling protrusion 112 corresponding to the first-second coupling hole 342 of the first guide part 300. The first coupling protrusion 110 may be a protrusion to which the first lens assembly 600 is coupled. For example, the first coupling protrusion 110 may correspond to the third coupling hole 640 of the first lens assembly 600.

The second coupling protrusion 120 may be a protrusion to which the second guide part 400 is coupled. For example, the second coupling protrusion 120 may correspond to the second coupling hole 440 of the second guide part 400. Accordingly, the second coupling protrusion 120 may include a second-first coupling protrusion 121 corresponding to the second-first coupling hole 441 of the second guide part 400 and a second-second coupling protrusion 122 corresponding to the second-second coupling hole 442 of the second guide part 400. Also, the second coupling protrusion 120 may be a protrusion to which the first lens assembly 600 is coupled. For example, the second coupling protrusion 120 may correspond to the fourth coupling hole 650 of the first lens assembly 600.

Meanwhile, the base 100 may include a base recess BR formed around the first coupling protrusion 110 and the second coupling protrusion 120. The base recess BR may be a recess designating a flow path of an adhesive member (not shown). When the first guide part 300 and the second guide recess BR are coupled to the base 100, the adhesive member (not shown) may be a bonding member applied around the first coupling protrusion 110 and the second coupling protrusion 120.

For example, the embodiment may include a first base recess 111*r* formed around the first-first coupling protrusion 111. The first base recess 111*r* may include a first portion having a shape corresponding to the first-first coupling protrusion 111 and a second portion extending from the first portion. The first portion and the second portion of the first base recess 111*r* may be connected to each other. The first portion and the second portion will be described in more detail below.

In addition, the base recess BR according to the embodiment may include a second base recess 112*r* formed around the first-second coupling protrusion 112. The second base recess 112*r* may include a first portion having a shape corresponding to the first-second coupling protrusion 112 and a second portion connected to the first portion and extending from the first portion.

In addition, the base recess BR according to the embodiment may include a third base recess 121*r* formed around the second-first coupling protrusion 121. The third base recess 121*r* may include a first portion having a shape corresponding to the second-first coupling protrusion 121 and a second portion connected to the first portion and extending from the first portion.

In addition, the base recess BR according to the embodiment may include a fourth base recess 122*r* formed around the second-second coupling protrusion 122. The fourth base recess 122*r* may include a first portion having a shape corresponding to the second-second coupling protrusion 122 and a second portion connected to the first portion and extending from the first portion.

Specifically, the fourth sidewall 100*d* of the base 100 may include a first region R1 in which the first coupling protrusion 110 and the second coupling protrusion 120 are provided, and a second region R2 other than the first region R1. In this case, the first region R1 and the second region R2 may have different heights or thicknesses. For example, the second region R2 may include a first protruding region P1 and a second protruding region P2 protruding in an optical axis direction based on the first region R1. That is, a first protruding region P1 and a second protruding region P2 may be formed in a region adjacent to the first region R1 where the coupling protrusions 110 and 120 are formed. The first region R1 and the second region R2 may be referred to as a stepped region.

In this case, the base recess BR includes a first portion BR1 formed around the coupling protrusions 110 and 120. The first portion BR1 may have a shape corresponding to the coupling protrusions 110 and 120.

Here, the base recess BR may function as a dam of the adhesive member (not shown) even when only the first portion BR1 is included. However, when the base 100 includes only the first portion BR1, it may be difficult to completely block an adhesive member (not shown) penetrating into an accommodation space inside the base 100.

Therefore, the embodiment includes an extension portion extending from the first portion BR1. For example, the base recess BR may include a second-first portion BR2 extending from the first portion BR1 and contacting the first protruding region P1. For example, the base recess BR may include a second-second portion BR3 extending from the first portion BR1 and contacting the second protruding region P2. The second-first portion BR2 and the second-second portion BR3 provide a flow path for an adhesive member (not shown) applied to the first portion BR1, and accordingly, it is possible to solve the problem that the adhesive member (not shown) overflows into the base 100.

Meanwhile, a coupling recess may be formed on an inner surface of the third sidewall 100*c* of the base 100. The coupling recess may include a first coupling recess 130 corresponding to the first guide part 300 and a second coupling recess 140 corresponding to the second guide part 400.

Specifically, a first coupling recess 130 may be provided on the inner surface of the third sidewall 100*c* of the base 100 so that the first guide protrusion 360 of the first guide part 300 is fitted. For example, the first coupling recess 130 may include a first-first coupling recess 131 corresponding to the first-first guide protrusion 361 of the first guide part 300 and a first-second coupling recess 132 corresponding to the first-second guide protrusion 362.

In addition, a second coupling recess may be provided on the inner surface of the third sidewall 100*c* of the base 100 so that the second guide protrusion 460 of the second guide part 300 is fitted. For example, the second coupling recess 140 may include a second-first coupling recess 141 into which the second-first guide protrusion 461 of the second guide part 400 is fitted and coupled and a second-second coupling recess 142 into which the second-second guide protrusion 462 is fitted.

Meanwhile, the base 100 may include a third opening OA3. Specifically, a third opening OA3 may be formed in the lower part 100*f* of the base 100. The third opening OA3 may be an insertion part into which a part of the driving part 200 is inserted. For example, the driving part 200 includes a driver IC 240 disposed on a circuit board 210. Also, the third opening OA3 formed in the lower part 100*f* of the base 100 may correspond to the driver IC. For example, the circuit board 210 of the driving part 200 is disposed on the outer surface of the base 100. And, the driver IC 240 disposed on the circuit board 210 may be disposed within the inner accommodation space of the base 100 through the third opening OA3.

<Driving Part>

FIGS. 19A, 19B, 20A and 20B are perspective views illustrating a driving part according to an embodiment, FIG. 21A is a perspective view of a part of a first driving part shown in FIG. 19, FIG. 21B is a detailed perspective view of a first yoke of a first driving part according to an embodiment, FIG. 21C is a bottom perspective view of a first yoke of the embodiment, FIG. 21D is a perspective view of some components of a first driving part according to a first additional embodiment, and FIG. 21E is a perspective view of some components of a first driving part according to a second additional embodiment.

Referring to FIGS. 19A to 21E, the driving part 200 may include a circuit board 210, a first driving part 220 and a second driving part 230. The first driving part 220 may include a coil, a magnet, and a yoke. Also, the second driving part 230 may include a coil, a magnet, and a yoke. In addition, each of the first and second driving parts 220 and 230 may include a position sensor for sensing a position of the magnet and the position of the second lens assembly 700 or the third lens assembly 800.

The circuit board 210 may be disposed surrounding an outer surface of the base 100. For example, the circuit board 210 may be disposed surrounding the first sidewall 100*a*, the second sidewall 100*b*, and the lower part 100*f* of the base 100.

For example, the circuit board 210 may include a first substrate region 210*a* disposed outside the first sidewall 100*a* of the base 100 and a second substrate region 210*b* disposed outside the second sidewall 100*b*. Also, the circuit board 210 may include a third substrate region 210*c* between the first substrate region 210*a* and the second substrate region 210*b*. The third substrate region 210*c* may be disposed on an outer surface of the lower part 100*f*. That is, the circuit board 210 in the embodiment may have a 'c' shape.

The first substrate region 210*a* and the second substrate region 210*b* may be disposed parallel to each other. That is, an inner surface of the first substrate region 210*a* and an inner surface of the second substrate region 210*b* may face each other at positions spaced apart from each other by a predetermined distance. In addition, the third substrate region 210*c* may connect the first substrate region 210*a* and the second substrate region 210*b*. Accordingly, the third substrate region 210*c* may be disposed perpendicular to the first substrate region 210*a* and the second substrate region 210*b*, respectively.

The circuit board 210 may be connected to a predetermined power supply unit (not shown) to apply power to a coil part disposed on the circuit board 210.

The circuit board 210 may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

A part of the first driving part 220 and the second driving part 230 may be disposed on the circuit board 210.

For example, the first driving part 220 may include a first coil 221, a first magnet 222, a first yoke 223 and a first position sensor 224.

In addition, the first coil 221 and the first position sensor 224 constituting the first driving part 220 may be disposed on the first substrate region 210*a* of the circuit board 210. The first position sensor 224 may be disposed on an inner surface of the first coil 221 on the first substrate region 210*a*.

In addition, the second driving part 230 may include a second coil 231, a second magnet 232, a second yoke 233, and a second position sensor 234.

In addition, the second coil 231 and the second position sensor 234 constituting the second driving part 230 may be disposed in the second substrate region 210*b* of the circuit board 210. The second position sensor 234 may be disposed on an inner surface of the second coil 231 on the second substrate region 210*b* of the circuit board 210.

The first coil 221 of the first driving part 220 may be disposed within the accommodation space of the base 100 through the first opening OA1 of the base 100 in a state of being disposed in the first substrate region 210*a* of the circuit board 210. Accordingly, the first coil 221 of the first driving part 220 may be disposed facing the first magnet 222 disposed on the second lens assembly 700.

In addition, the second coil 231 of the second driving part 230 may be disposed within the accommodation space of the base 100 through the second opening OA2 of the base 100 in a state of being disposed in the second substrate region 210*b* of the circuit board 210. Accordingly, the second coil 231 of the second driving part 230 may be disposed facing the second magnet 232 disposed on the third lens assembly 800.

The first magnet 222 of the first driving part 220 is disposed on the second lens assembly 700. In addition, the second magnet 232 of the second driving part 230 is disposed on the third lens assembly 800.

Accordingly, when a current is applied to the first coil 221 disposed on the circuit board 210, the embodiment may allow the second lens assembly 700 to move in the optical axis direction corresponding to a direction and an intensity of the applied current by the electromagnetic force between the first coil 221 and the first magnet 222.

In addition, when a current is applied to the second coil 231 disposed on the circuit board 210, the embodiment may allow the third lens assembly 800 to move in the optical axis direction corresponding to a direction and an intensity of the applied current by the electromagnetic force between the second coil 231 and the second magnet 232.

To this end, the embodiment includes a driver IC 240 disposed on the circuit board 210 and controlling the first driving part 220 and the second driving part 230. The driver IC 240 may provide control signals to the first driving part 220 and the second driving part 230. In this case, the control signals may include an intensity and a direction of the current applied to the first coil 221 constituting the first driving part 220. In addition, the control signals may include an intensity and a direction of the current applied to the second coil 231 constituting the second driving part 230.

The embodiment allows the driver IC 240 to be disposed on the circuit board 210. Furthermore, the driver IC 240 in the embodiment is disposed on the third substrate region 210*c* of the circuit board 210.

That is, the driver IC 240 is electrically connected to the first position sensor 224 and the second position sensor 234. Specifically, the driver IC 240 may receive a first sensing signal from the first position sensor 224 and output a first control signal to the first coil 221 based on this. In addition, the driver IC 240 may receive a second sensing signal from the second position sensor 234 and output a second control signal to the second coil 231 based on this.

Here, the driver IC of the comparative example is disposed on a sensor substrate (not shown) on which an image sensor is disposed, instead of the circuit board of the driving part 200. And, when the driver IC 240 is disposed on the sensor substrate, an image sensor other than the driver IC 240 is disposed on the sensor substrate, and thus, a size restriction is severe.

In addition, the driver IC of the comparative example was disposed on the first substrate region or the second substrate region of the circuit board. In this case, a length of a connection line between the driver IC and the position sensor increases, and accordingly, it has a structure vulnerable to noise. For example, when the driver IC is disposed on the first substrate region of the circuit board, although the distance between the driver IC and the first position sensor 224 may decrease, the distance between the driver IC and the second position sensor increases correspondingly, and as a result, there is a problem in that sensing accuracy is reduced because noise is included in the sensing information of the second position sensor.

Therefore, the driver IC 240 of the embodiment is disposed between the first position sensor 224 and the second position sensor 234.

Specifically, a distance between the driver IC 240 and the first position sensor 224 in the embodiment corresponds to a distance between the driver IC 240 and the second position sensor 234.

To this end, the driver IC 240 may be disposed on the third substrate region 210*c* of the circuit board 210. That is, in the embodiment, the driver IC 240 is disposed on the third substrate region 210*c* of the circuit board 210, not on the first substrate region 210*a* and the second substrate region 210*b*. Accordingly, in the embodiment, it is possible to improve the problem of increasing the influence of noise on a specific sensor among the first position sensor 224 and the second position sensor 234, thereby improving sensing accuracy.

In this case, the distance may correspond to the distance of the circuit pattern.

Specifically, the circuit board 210 includes a first signal line 241 corresponding to a circuit pattern connecting between the driver IC 240 and the first position sensor 224. In addition, the circuit board 210 includes a second signal line 242 corresponding to a circuit pattern connecting between the driver IC 240 and the second position sensor 234.

In this case, the length of the first signal line 241 may correspond to the length of the second signal line 242. Here, lengths corresponding to each other may mean that the length of the first signal line and the length of the second signal line are equal to each other, but is not limited thereto. For example, the lengths corresponding to each other may mean that the length of the second signal line with respect to the length of the first signal line is within a preset tolerance. The tolerance may be ±5%. For example, the length of the first signal line 241 in the embodiment may have a range between 95% and 105% of the length of the second signal line 242. Contrary to this, the length of the second signal line 242 in the embodiment may have a range between 95% and 105% of the length of the first signal line 241.

As described above, the camera actuator according to an embodiment and a camera module including the same may improve operation reliability. In detail, the camera actuator and camera module according to the embodiment include a circuit board. In addition, a first driving part driving the second lens assembly and a second driving part driving the third lens assembly are disposed on the circuit board. The first driving part includes a first position sensor for sensing a position of a second lens assembly, and the second driving part includes a second position sensor for sensing a position of the third lens assembly. In addition, the circuit board includes a driver IC that controls the first driving part and the second driving part. In this case, the driver IC in the embodiment is disposed on the circuit board together with the first position sensor and the second position sensor. In addition, the driver IC in the embodiment is disposed between the first position sensor and the second position sensor on the circuit board. Specifically, a first distance between the first position sensor and the driver IC on the circuit board corresponds to a second distance between the second position sensor and the driver IC. Specifically, a length of a first signal line connecting between the first position sensor and the driver IC on the circuit board corresponds to a length of a second signal line connecting the second position sensor and the driver IC. Accordingly, the embodiment can minimize the distance between each position sensor and the driver IC, and thereby improve the sensing accuracy by minimizing the effect of noise. In addition, the embodiment allows the driver IC to be disposed on the same circuit board together with the first and second position detection sensors, thereby minimizing an increase in size.

In addition, when the second lens assembly 700 and the third lens assembly 800 are driven by the electromagnetic force between the coil and the magnet during AF or zoom implementation, the embodiment may provide a camera actuator capable of preventing magnetic field interference between magnets to which each lens assembly is mounted, and a camera module including the same.

Specifically, the embodiment includes a first yoke 223 disposed between the second lens assembly 700 and the first magnet 222. In addition, the embodiment includes a second yoke 233 disposed between the third lens assembly 800 and the second magnet 232.

In this case, the first yoke 223 and the second yoke 233 may have shapes corresponding to each other. Accordingly, only the first yoke 223 will be described in detail below.

Referring to FIG. 21A, the first yoke 223 includes a first supporting part 223*a*1 and a first side surface protruding 223*a*2 part extending in a lateral direction of the first magnet 222 from the first supporting part 223*a*1.

The first side surface protruding part 223*a*2 may be disposed on both side surfaces of the first magnet 222.

In addition, the first yoke 223 may include a first fixed protruding part 223*a*3 extending in a direction different from that of the first side surface protruding part 223*a*2, for example, in an opposite direction.

The first fixed protruding part 223*a*3 may be disposed at the center of the first supporting part 223*a*1, but is not limited thereto.

Similarly, the second yoke 233 of the embodiment may include a second supporting part, a second side surface protruding part, and a second fixed protruding part corresponding to the first yoke 223.

In the related art, when implementing AF or Zoom, a plurality of lens assemblies are driven by an electromagnetic force between a magnet and a coil, and there is a problem that a magnetic field interference occurs between magnets mounted in each lens assembly. There is a problem that AF or Zoom driving is not performed normally, and thrust is deteriorated due to such a magnetic field interference between magnets.

In addition, there is a problem that a decent or tilt phenomenon due to a magnetic field interference between magnets is induced.

When an issue in a precision in camera control occurs or thrust is deteriorated due to such a magnetic field interference, or a decent or tilt phenomenon is induced, it may be directly related to the safety or life of a driver who is a user or pedestrian.

In particular, in case of a high-magnification Zoom Actuator applied recently, there is a problem that not only magnetic field interference occurs between permanent magnets of the first lens assembly and the second lens assembly, which are moving lenses, but also the magnetic field interference (IF) with a magnet of the OIS actuator occurs.

Movement of each group is disturbed due to the magnetic field interference (IF), and as a result, there is a problem that an input current is also increased.

According to the embodiment, a yoke in a driving part of the first lens assembly 110 or the second lens assembly 120 includes a side surface protruding part extending to a side surface of the magnet, and thus there is a special technical effect that it is possible to provide a camera actuator capable of preventing a magnetic field interference between magnets mounted on each lens assembly when a plurality of lens assemblies are driven by an electromagnetic force between a magnet and a coil when AF or Zoom is implemented, and a camera module including the same.

FIGS. 21B and 21C, the first yoke 223 may include a first supporting part 223*a*1, and a first side surface protruding part 223*a*2 extending from the first supporting part 223*a*1 to the side of the first magnet 222. The first side surface protruding part 223*a*2 may be disposed on both side surfaces of the first magnet 222. The first yoke 223 may be formed of a ferromagnetic material, but is not limited thereto.

The first yoke 223 may include a first fixed protruding part 223*a*3 protruding in a direction different from that of the first side surface protruding part 223*a*2, for example, in an opposite direction. The first yoke 223 may include a supporting part recess 223*ar* between the first side surface protruding part 223*a*2 and the first fixed protruding part 223*a*3. The structures of the first side surface protruding part 223*a*2 and the first fixed protruding part 223*a*3 may be more firmly formed by the supporting part recess 223*ar*.

According to the embodiment, the first yoke 223 includes a first side surface protruding part 223*a*2 extending to the side surface of the first magnet 222, and the side surface protruding part 223*a*2 is disposed on both sides of the first support part 223*a*1, so that it can function to firmly fix the first magnet 222 and improve mechanical reliability.

Accordingly, the first yoke 223 includes a first side surface protruding part 223*a*2 extending to the side of the first magnet 222, so that it can prevent magnetic field interference between magnets mounted on each lens assembly and can achieve thrust improvement according to magnetic flux concentration.

In addition, the first yoke 223 includes a first fixed protruding part 223*a*3 extending in a direction different from that of the first side surface protruding part 223*a*2, for example, in an opposite direction, so that it can improve mechanical bonding. For example, the embodiment can improve mechanical reliability by fixing the first fixed protruding part 223*a*3 to the second lens assembly 700 while the first yoke 223 includes a first fixed protruding part 223*a*3 extending in the opposite direction of the first side surface protruding part 223*a*2.

Meanwhile, according to an additional embodiment, a second thickness T2 of the first side surface protruding part 223*a*2 may be formed greater than a first thickness T1 of the first supporting part 223*a*1. Accordingly, since the thickness of the yoke is thick in the region where the magnetic flux density is high, the efficiency of dissipation of the magnetic flux density increases, thereby improving the shielding function of the magnetic flux and concentrating the magnetic flux.

According to the first additional embodiment according to FIG. 21D, the yoke 223A may include a first supporting part 223*a*1, a first side surface protruding part 223*a*2 extending from the first supporting part 223*a*1 to the side surface of the first magnet 222, and a first extension protruding part 223*a*22 extending upward from the first side surface protruding part 223*a*2 to an upper surface of the first magnet 222.

Accordingly, a total thickness of the first side surface protruding part 223*a*2 and the second extension protrusion 223*a*22 may be greater than the thickness of the first magnet 222.

According to the first additional embodiment, a yoke in a driving part of a first lens assembly 700 and a second lens assembly 800 includes an extension protruding part extending more upward than an upper surface of a magnet, and thus there is a special technical effect that leakage flux may be more effectively prevented, and thrust may be significantly improved by maximizing concentration of magnetic flux in a region having a high magnetic flux density.

In addition, referring to FIG. 21E, the yoke 223A of the camera module according to the second additional embodiment may include a first supporting part 223*a*1, a first side surface protruding part 223*a*2 extending from the first support part 223*a*1 to a first side surface of the first magnet 222, and a second side surface protruding part 223*a*4 protruding to a second side surface of the first magnet 222.

The first side surface of the first magnet 222 and the second side surface of the first magnet 222 may not face each other.

According to the second additional embodiment, a yoke in a driving part of a second lens assembly 700 and a third lens assembly 80 includes a side surface protruding part having a structure surrounding four side surfaces of a magnet, and thus there is a technical effect that leakage flux may be more effectively prevented, and a magnetic flux density in which the leakage flux is prevented may be used to improve thrust.

<Second Camera Actuator>

FIG. 22 is a perspective view of a camera module according to an embodiment, and FIG. 23 is a perspective view of a camera module according to the embodiment in which some components are omitted.

Referring to FIGS. 22 and 23, the camera module 10 according to the embodiment may include one or a plurality of camera actuators. For example, the camera module 10 may include a first camera actuator 1000 and a second camera actuator 2000, and may include a cover case 15 protecting the first camera actuator 1000 and the second camera actuator 2000.

The first camera actuator 1000 may support a plurality of lenses and perform a zoom function or an auto focus function by moving the lenses in an optical axis direction in response to a control signal from a controller. That is, the first camera actuator 1000 may be the above-described camera actuator of FIGS. 1 to 14.

The second camera actuator 2000 may be an Optical Image Stabilizer (OIS) actuator. In this case, light incident on the camera module 10 from the outside may be firstly incident on the second camera actuator 2000. In addition, the path of the light incident on the second camera actuator 2000 may be changed to be incident on the first camera actuator 1000, and light passing through the first camera actuator 1000 may be incident to the image sensor 900.

FIG. 24 is an exploded perspective view of a second camera actuator according to an embodiment. In addition, FIG. 25 is a view of a third driving part of a second camera actuator according to an embodiment, and FIG. 26 is a view of a third housing of a second camera actuator according to an embodiment. In addition, FIGS. 27 and 28 are views of a prism unit of a second camera actuator according to an embodiment.

A second camera actuator according to an embodiment will be described in more detail with reference to FIGS. 24 to 28.

Referring to FIG. 24, the second camera actuator 2000 may include a cover member 2100, a third housing 2200, a third driving part 2300, and a prism unit 2400.

The cover member 2100 may include an accommodation space therein and at least one side thereof may be open. For example, the cover member 2100 may have a structure in which a plurality of side surfaces connected to each other are open. In detail, the cover member may have a structure in which a front surface through which light is incident from the outside, a lower surface corresponding to the first camera actuator 1000, and a rear surface opposite to the front surface are open, and may provide a light path of the prism unit 2400 to be described later.

The cover member 2100 may include a rigid material. For example, the cover member 100 may include a material such as resin, metal, or ceramic, and may support the third housing 2200 disposed in the accommodating space. For example, the cover member 2100 may surround and support the third housing 2200, the third driving part 2300, and the prism unit 2400.

Referring to FIG. 25, the third driving part 2300 may include a driving part circuit board 2310, a coil part 2330, and a magnet 2350.

The driving part circuit board 2310 may be connected to a power supply unit (not shown) to apply power to the coil part 2330. The driving part circuit board 2310 is a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

The coil part 2330 may be electrically connected to the driving part circuit board 2310. The coil part 2330 may include one or a plurality of coil parts. For example, the coil part 2330 may include a first coil part 2331, a second coil part 2332, and a third coil part 2333.

The first to third coil parts 2331, 2332, and 2333 may be spaced apart from each other. For example, the driving part circuit board 2310 may have a 'c' shape, and the first coil part 2331 and the second coil part 2332 may be disposed on the first and second surfaces of the driving part circuit board 2310 facing each other, respectively. In addition, the third coil part 2333 may be disposed on a third surface connecting the first and second surfaces of the driving part circuit board 2310.

The magnet 2350 may include one or a plurality of magnets. For example, the magnet 2350 may include a first magnet 2351, a second magnet 2352, and a third magnet 2353 disposed in a region corresponding to the coil part 2330. In detail, the first magnet 2351 may be disposed on a region corresponding to the first coil part 2331 on the first surface of the driving part circuit board 2310. In addition, the second magnet 2352 may be disposed on a region corresponding to the second coil part 2332 on the second surface of the driving part circuit board 2310. In addition, the third magnet 2353 may be disposed on a region corresponding to the third coil part 2333 on the third surface of the driving part circuit board 2310.

The third driving part 2300 may further include a hall sensor. For example, the hall sensor may include a first hall sensor (not shown) disposed adjacent to one coil part selected from among the first coil part 2331 and the second coil part 2332 and a second Hall sensor (not shown) disposed adjacent to the third coil part 2333.

The third driving part 2300 may tilt the prism unit 2400. The third driving part 2300 may tilt the prism unit 2400 along a first axis or a second axis.

Referring to FIG. 26, the third housing 2200 may include an accommodation space to accommodate the prism unit 2400. The third housing 2200 may include a plurality of inner surfaces. For example, the third housing 2200 may include a first surface 2200S1 corresponding to the first region of the driving part circuit board 2310, a second surface 2200S2 corresponding to the second region of the driving part circuit board 2310, and a third surface 2200S3 corresponding to the third region of the driving part circuit board 2310.

In detail, the third housing 2200 may include a first surface 2200S1 corresponding to the first coil part 2331, a second surface 2200S2 corresponding to the second coil part 2332, and a third surface 2200S3 corresponding to the third coil part 2333. In addition, the third housing 2200 may include a fourth surface 2200S4 connected to the first surface 2200S1 and the second surface 2200S2 and connected to the third surface 2200S3.

The third housing 2200 may include a plurality of housing holes 2210. The housing hole 2210 may be a through hole passing through outer and inner surfaces of the third housing 2200. The plurality of housing holes 2210 may include first to third housing holes 2211, 2212, and 2213. The first housing hole 2211 may be a through hole passing through the first surface 2200S1 and an outer surface corresponding to the first surface 2200S1. The second housing hole 2212 may be a through hole passing through the second surface 2200S2 and an outer surface corresponding to the second surface 2200S2. The third housing hole 2213 may be a through hole passing through the third surface 2200S3 and an outer surface corresponding to the third surface 2200S3.

The first housing hole 2211 may be disposed in a region corresponding to the first coil part 2331. In addition, the first housing hole 2211 may have a size and shape corresponding to that of the first coil part 2331. Accordingly, the first coil part 2331 may be partially or entirely inserted into the first housing hole 2211 and disposed.

The second housing hole 2212 may be disposed in a region corresponding to the second coil part 2332. In addition, the second housing hole 2212 may have a size and shape corresponding to that of the second coil part 2332. Accordingly, the second coil part 2332 may be partially or entirely inserted into the second housing hole 2212 and disposed.

The third housing hole 2213 may be disposed in a region corresponding to the third coil part 2333. In addition, the third housing hole 2213 may have a size and shape corresponding to that of the third coil part 2333. Accordingly, the third coil part 2333 may be partially or entirely inserted into the third housing hole 2213 and disposed.

Referring to FIGS. 27 and 28, the prism unit 2400 may be disposed in the third housing 2200. In detail, the prism unit 2400 may be disposed in the accommodation space of the third housing 2200.

The prism unit 2400 may include a prism 2410 and a prism mover 2430 disposed on the prism 2410.

The prism 2410 may be a right-angle prism. The prism 2410 may reflect a direction of light incident from the outside. That is, the prism 2410 may change a path of light incident to the second camera actuator 2000 from the outside toward the first camera actuator 1000.

The prism mover 2430 may be disposed on the prism 2410. The prism mover 2430 may be disposed surrounding the prism 2410. At least one side surface of the prism mover 2430 may be open and may include an accommodation space therein. In detail, the prism mover 2430 may have a structure in which a plurality of outer surfaces connected to each other are open. For example, the prism mover 2430 may have a structure in which an outer surface corresponding to the prism 2410 is open, and may include an accommodation space defined as a first space 2435 therein.

The prism mover 2430 may include an inner surface 2435S. The inner surface 2435S may be an inner surface constituting the first space 2435. The first space 2435 may have a shape corresponding to that of the prism 2410. An inner surface 2435S of the first space 2435 may directly contact the prism 2410.

The prism mover 2430 may include a step 2436. The step 2436 may be disposed in the first space 2435. The step 2436 may serve as a guide and/or a seating part for the prism 2410. In detail, a protruding part corresponding to the step 2436 may be formed on an outer side of the prism 2410. The protruding part of the prism 2410 may be guided to the step 2436 of the prism mover 2430 and disposed in the first space 2435. Accordingly, the prism mover 2430 can effectively support the prism 2410. In addition, the prism 2410 may be seated at a set position and may have improved alignment characteristics in the prism mover 2430.

The prism unit 2400 may include a plurality of outer surfaces. For example, the prism mover 2430 may include a plurality of outer surfaces. The prism mover 2430 may include a first outer surface 2430S1 corresponding to the first surface 2200S1 of the third housing 2200, a second outer surface 2430S2 corresponding to the second surface 2200S2, a third outer surface 2430S3 corresponding to the third surface 2200S3 and a fourth outer surface 2430S4 corresponding to the fourth surface 2200S4.

In addition, the prism mover 2430 may include a plurality of recesses. The recess may be a recess having a concave shape in a direction of the first space 2435 on the outer surface of the prism mover 2430. The plurality of recesses may include a third recess 2433R1, a fourth recess 2433R2, and a fifth recess 2433R3. For example, the third recess 2433R1 may be provided on the first outer surface 2430S1. The third recess 2433R1 may be provided in a region corresponding to the first housing hole 2211. In addition, the fourth recess 2433R2 may be provided on the second outer surface 2430S2. The fourth recess 2433R2 may be provided in a region corresponding to the second housing hole 2212. In addition, the fifth recess 2433R3 may be provided on the third outer surface 2430S3. The fifth recess 2433R3 may be provided in a region corresponding to the third housing hole 2213. That is, the first housing hole 2211 may correspond to the first coil part 2331 and the second housing hole 2212 may correspond to the second coil part 2332. In addition, the third housing hole 2213 may correspond to the third coil part 2333.

The magnet 2350 may be disposed in the recess. For example, the first magnet 2351 is disposed in the third recess 2433R1, the second magnet 2352 is disposed in the fourth recess 2433R2, and the third magnet 2353 is disposed in the third recess 2433R1, and thus, they can be spaced apart from each other.

The prism unit 2400 may control tilting in a first axis (x axis) or a second axis (y axis) by the driving part of the third driving part 2300. Here, the first axis tilting may mean tilting in an up-down direction (y-axis direction; second direction) with the x-axis direction shown in the drawing as a rotation axis, and the second axis tilting may mean tilting in a left-right direction (x-axis direction; first direction) with the y-axis direction shown in the drawing as a rotation axis.

When a power is applied, the prism unit 2400 may be tilt-controlled based on attractive force and repulsive force generated from the third coil part 2333 and the third magnet 2353.

In detail, the third driving part 2300 may be provided to rotate and move the prism unit 2400 about a first imaginary line (not shown) formed by the first coil part 2331, the second coil part 2332, the first magnet 2351 and the second magnet 2352 as a rotational axis. Here, the first line may be a line extending in a first direction (x-axis direction).

The third coil part 2333 and the third magnet 2353 may rotate and move the prism unit 2400 in an up-down direction (y-axis direction) with the first line as a rotational axis.

For example, a repulsive force may be generated between the third coil part 2333 and the third-first magnet of the third magnet 2353, and an attractive force may be generated the third coil part 2333 and the third-second magnet of the third magnet 2353. Here, the third-first magnet and the third-second magnet may face each other in a third direction (z-axis direction). In this case, the prism unit 2400 may be tilted upward (based on the y-axis direction) by the generated electromagnetic force.

In addition, an attractive force may be generated between the third coil part 2333 and the third-first magnet of the third magnet 2353, and a repulsive force may be generated the third coil part 2333 and the third-second magnet of the third magnet 2353. In this case, the prism unit 2400 may tilt downward (based on the y-axis direction) by the generated electromagnetic force.

When a power is applied, the prism unit may be tilt controlled based on attractive and repulsive forces generated from the first coil part 2331, the second coil part 2332, the first magnet 2351 and the second magnet 2352.

In detail, the third driving part 2300 may be provided to rotate and move the prism unit 2400 about a second imaginary line (not shown) formed by the third coil part 2331 and the third magnet 2352 as a rotational axis. Here, the second line may be a line extending in a second direction (y-axis direction).

The first coil part 2331, the second coil part 2332, the first magnet 2351, and the second magnet 2352 may rotate and move the prism unit 2400 in the left-right direction (x-axis direction) with the second line as a rotation axis.

For example, a repulsive force may be generated between the first coil part 2331 and the first-first magnet of the first magnet 351, and an attractive force may be generated between the first coil part 2331 and the first-second magnet of the first magnet 2351. In addition, an attractive force may be generated between the second coil part 2332 and the second-first magnet of the second magnet 2352, and a repulsive force may be generated between the second coil part 2332 and the second-second magnet of the second magnet 2352. Here, the first-first magnet and the second-first magnet may face each other in a first direction, and the first-second magnet and the second-second magnet may face each other in a first direction. In this case, the prism unit 2400 may be tilted in the left direction (based on the x-axis direction) by the formed electromagnetic force.

For example, an attractive force may be generated between the first coil part 2331 and the first-first magnet of the first magnet 351, and a repulsive force may be generated between the first coil part 2331 and the first-second magnet of the first magnet 2351. In addition, a repulsive force may be generated between the second coil part 2332 and the second-first magnet of the second magnet 2352, and an attractive force may be generated between the second coil part 2332 and the second-second magnet of the second magnet 2352. In this case, the prism unit 2400 may be tilted in the right direction (based on the x-axis direction) by the formed electromagnetic force.

That is, the second camera actuator 2000 according to the embodiment may control the movement path of incident light by the third driving part 2300 including a voice coil motor (VCM) method. However, the embodiment is not limited thereto, and the third driving part 2300 may include a piezoelectric element, for example, a piezo-electric device or a shape memory alloy, and accordingly, it can control the moving path of the incident light using the piezo element and/or the shape memory alloy.

A camera actuator according to an embodiment and a camera module including the same may improve assembly reliability. In detail, the camera actuator and camera module according to the embodiment includes a base recess formed around a coupling protrusion of a base and designating a flow path for an adhesive member. Accordingly, the embodiment can solve a problem that the adhesive member overflows to an inside of the base, thereby improving assembly reliability. Furthermore, the embodiment allows the base recess to include an extension portion extending therefrom, rather than being formed only around the coupling protrusion of the base. Accordingly, the embodiment can further prevent the adhesive member from penetrating into the base, thereby improving product reliability.

In addition, the camera actuator according to the embodiment and the camera module including the same further form a recess around the coupling hole of the rail guide part and accordingly, this prevents overflow of the adhesive member that may occur when the rail guide part and the lens assembly are coupled. In this case, the recess is not formed only around the coupling hole, but includes an additional recess spaced apart from the coupling hole and partitioning a region between the region where the coupling hole is formed and the rail of the rail guide part. Accordingly, the embodiment may prevent the adhesive member from penetrating into the rail of the rail guide part, thereby improving the movement accuracy of the lens assembly.

FIG. 29 is a perspective view of a mobile terminal to which a camera module according to an embodiment is applied.

Referring to FIG. 29, the mobile terminal 3 according to the embodiment may include a camera module 10, an autofocus device 31 and a flash module 33 provided on a back surface.

The camera module 10 may include an image capturing function and an autofocus function. For example, the camera module 10 may include an autofocus function using an image.

The camera module 10 processes a still image or a moving image frame obtained by an image sensor in a photographing mode or a video call mode. The processed image frame may be displayed on a predetermined display unit, and may be stored in a memory. A camera (not shown) may be disposed on a front surface of the body of the mobile terminal.

For example, the camera module 10 may include a first camera module 10A and a second camera module 10B. In this case, at least one of the first camera module 10A and the second camera module 10B may include the above-described camera module, for example, the camera module 10 according to FIGS. 1 to 20. Accordingly, the camera module 10 may implement an OIS function together with a zoom function and an autofocus function.

The autofocus device 31 may include an autofocus function using a laser. The autofocus device 31 may be mainly used in a condition in which an autofocus function using an image of the camera module 10 is deteriorated, for example, in a close environment of 10 m or less or a dark environment. The autofocus device 31 may include a light-emitting unit including a vertical cavity surface emitting laser (VCSEL) semiconductor device, and a light receiving unit that converts light energy into electric energy such as a photodiode.

The flash module 33 may include a light-emitting device that emits light therein. The flash module 33 may be operated by a camera operation of a mobile terminal or by user control.

Next, FIG. 30 is a perspective view of a vehicle 5 to which a camera module according to an embodiment is applied. For example, FIG. 30 is an appearance view of a vehicle having a vehicle driving assistance device to which a camera module 10 according to the embodiment is applied.

Referring to FIG. 30, the vehicle 5 according to the embodiment may include wheels 53FL and 53FR that rotate by a power source, and a predetermined sensor. The sensor may be a camera sensor 51, but the embodiment is not limited thereto.

The camera 51 may be a camera sensor to which the camera module 10 according to the embodiment is applied.

The vehicle 5 according to the embodiment may acquire image information through the camera sensor 51 that photographs a front image or a surrounding image, and may determine an unidentified situation of a lane by using the image information and generate a virtual lane in the unidentified situation.

For example, the camera sensor 51 may acquire the front image by photographing a front of the vehicle 5, and a processor (not shown) may acquire the image information by analyzing an object included in the front image.

For example, when an object such as a lane, a neighboring vehicle, a traveling obstacle, and a median strip, a curb, and a street tree corresponding to an indirect road marking is photographed in an image photographed by the camera sensor 51, the processor detects such an object to include in the image information.

In this case, the processor may acquire distance information with the object detected through the camera sensor 51 to further complement the image information. The image information may be information about an object captured in the image.

Such a camera sensor 51 may include an image sensor and an image processing module. The camera sensor 51 may process a still image or moving image obtained by the image sensor (e.g., CMOS or CCD). The image processing module may process the still image or moving image acquired through the image sensor to extract necessary information, and may transmit the extracted information to the processor.

In this case, the camera sensor 51 may include a stereo camera so as to improve the measurement accuracy of the object and to secure more information such as a distance between the vehicle 5 and the object, but the embodiment is not limited thereto.

The invention claimed is:

1. A camera actuator comprising:

a moving part including a lens; and a driving part for moving the moving part in an optical axis direction, wherein the driving part includes:

a circuit board;

a sensing part disposed on the circuit board and sensing a position of the moving part; and a driver IC disposed on the circuit board and connected to the sensing part, wherein the circuit board includes a first substrate region disposed on one side of the moving part and overlapping the moving part in a first direction perpendicular to the optical axis direction, a second substrate region disposed on another side of the moving part and facing the first substrate region in the first direction, and a third substrate region connecting between the first substrate region and the second substrate region and overlapping the moving part in a second direction perpendicular to the optical axis direction and the first direction, wherein the sensing part includes a first sensing part disposed on the first substrate region and a second sensing part disposed on the second substrate region, wherein the driver IC is disposed on the third substrate region, wherein the circuit board includes a first signal line connecting between the first sensing part and the driver IC and a second signal line connecting between the second sensing part and the driver IC, and wherein a length of the first signal line satisfies a range of 95% to 105% of a length of the second signal line.

2. The camera actuator of claim 1, further comprising:

a base; and a rail guide part coupled to the base, wherein the moving part includes second and third lens assemblies disposed in the base and moving along the rail guide part, wherein the first sensing part senses a position of the second lens assembly, and wherein the second sensing part senses a position of the third lens assembly.

3. The camera actuator of claim 2, wherein the base includes a first sidewall facing the first substrate region, a second sidewall facing the first sidewall and the second substrate region, and a lower part between the first sidewall and the second sidewall and facing the third substrate region.

4. The camera actuator of claim 3, wherein the first sensing part and the second sensing part are disposed facing each other on the first and second substrate regions.

5. The camera actuator of claim 3, wherein the driving part includes:

a first coil disposed on the first substrate region and surrounding the first sensing part; and a second coil disposed on the second substrate region and surrounding the second sensing part, wherein the first sensing part is disposed inside the first coil, and wherein the second sensing part is disposed inside the second coil.

6. The camera actuator of claim 3, wherein the rail guide part includes:

a first guide part disposed adjacent to the first sidewall of the base and including a first rail; and a second guide part disposed adjacent to the second sidewall of the base and including a second rail;

wherein the second lens assembly moves along the first rail of the first guide part, and wherein the third lens assembly moves along the second rail of the second guide part.

7. The camera actuator of claim 5, wherein the base includes:

a first opening formed in the first sidewall and corresponding to the first coil;

a second opening formed in the second sidewall and corresponding to the second coil; and a third opening formed in the lower part and corresponding to the driver IC.

8. The camera actuator of claim 6, wherein the base includes a coupling protrusion and a base recess provided along a circumference of the coupling protrusion, and wherein the rail guide part includes a coupling hole corresponding to the coupling protrusion of the base.

9. The camera actuator of claim 8, wherein the base includes a stepped region, wherein the stepped region includes a first region in which the coupling protrusion is formed; and a second region protruding from the first region, and wherein the base recess includes:

a first recess part provided along a circumference of the coupling protrusion on the first region; and a second recess part extending from the first recess part toward the second region of the base and connected to the second region of the base.

10. The camera actuator of claim 9, wherein the coupling protrusion includes a first coupling protrusion to which the first guide part is coupled, and a second coupling projection to which the second guide part is coupled, and wherein the base recess includes a first base recess provided along a circumference of the first coupling protrusion and a second base recess provided along a circumference of the second coupling protrusion.

11. The camera actuator of claim 10, wherein the first base recess is disposed to face the first guide part, and wherein the second base recess is disposed to face the second guide part.

12. The camera actuator of claim 10, wherein the coupling hole includes:

a first coupling hole provided in the first guide part and corresponding to the first coupling protrusion; and a second coupling hole provided in the second guide part and corresponding to the second coupling protrusion, wherein the first guide part includes a first guide recess provided along a circumference of the first coupling hole, and wherein the second guide part includes a second guide recess provided along a circumference of the second coupling protrusion.

13. The camera actuator of claim 12, wherein each of the first coupling protrusion and the second coupling protrusion is provided in plurality, wherein the first coupling hole is provided in plurality to correspond to the first coupling protrusion, and wherein the second coupling hole is provided in plurality to correspond to the second coupling protrusion.

14. The camera actuator of claim 13, wherein the first guide part includes a first extension recess spaced apart from the plurality of first coupling holes and extending along a direction in which the plurality of first coupling holes are separated, and wherein the second guide part includes a second extension recess spaced apart from the plurality of second coupling holes and extending in a direction in which the plurality of second coupling holes are separated.

15. The camera actuator of claim 13, wherein the plurality of first coupling holes have different shapes or sizes, and the plurality of second coupling holes have different shapes or sizes.

16. A camera actuator comprising:

a base including a first sidewall, a second sidewall facing the first sidewall, and a lower part between the first sidewall and the second sidewall;

a first guide part disposed adjacent to the first sidewall of the base and including a first rail;

a second guide part disposed adjacent to the second sidewall of the base and including a second rail;

a first lens assembly coupled to the base and fixed;

a second lens assembly disposed in the base and moving along the first rail of the first guide part;

a third lens assembly disposed in the base and moving along the second rail of the second guide part; and a driving part driving the second lens assembly and the third lens assembly, wherein the driving part includes:

a circuit board;

a first driving part disposed on the circuit board, including a first position sensor for sensing a position of the second lens assembly, and driving the second lens assembly;

a second driving part disposed on the circuit board, including a second position sensor for sensing a position of the third lens assembly, and driving the third lens assembly; and a driver IC disposed on the circuit board and connected to the first driving part and the second driving part;

wherein a signal distance between the driver IC and the first position sensor corresponds to a signal distance between the driver IC and the second position sensor, wherein the circuit board includes a first substrate region disposed on one side of the second lens assembly and overlapping the second lens assembly in a first direction perpendicular to an optical axis direction, a second substrate region disposed on another side of the third lens assembly and facing the first substrate region in the first direction, and a third substrate region connecting between the first substrate region and the second substrate region and overlapping the second lens assembly and the third lens assembly in a second direction perpendicular to the optical axis direction and the first direction, wherein the first position sensor is disposed on the first substrate region, wherein the second position sensor is disposed on the second substrate region, wherein the driver IC is disposed on the third substrate region, wherein a first signal line connecting between the driver IC and the first position sensor and a second signal line connecting between the driver IC and the second position sensor are disposed on the first to third substrate regions, and wherein a length of the first signal line satisfies a range of 95% to 105% of a length of the second signal line.

* * * * *